(12) United States Patent
Tomaru

(10) Patent No.: US 8,582,770 B2
(45) Date of Patent: Nov. 12, 2013

(54) CRYPTOGRAPHIC COMMUNICATION SYSTEM

(75) Inventor: Tatsuya Tomaru, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 110 days.

(21) Appl. No.: 13/201,001

(22) PCT Filed: Jun. 30, 2009

(86) PCT No.: PCT/JP2009/061893
§ 371 (c)(1),
(2), (4) Date: Aug. 11, 2011

(87) PCT Pub. No.: WO2010/103677
PCT Pub. Date: Sep. 16, 2010

(65) Prior Publication Data
US 2011/0311050 A1    Dec. 22, 2011

(30) Foreign Application Priority Data
Mar. 11, 2009  (JP) .................... PCT/JP2009/054653

(51) Int. Cl.
H04L 29/06   (2006.01)
(52) U.S. Cl.
USPC .......................................................... 380/256
(58) Field of Classification Search
USPC .......................................................... 380/256
See application file for complete search history.

(56) References Cited

U.S. PATENT DOCUMENTS 7,333,611 B1   2/2008  Yuen et al.
7,831,049 B1 * 11/2010 Kanter ........................ 380/256

(Continued)

FOREIGN PATENT DOCUMENTS

JP    2008-92484     4/2008
JP    2008-245053    10/2008

(Continued)

OTHER PUBLICATIONS

Yuen et al., "Security of Y-00 and Similar Quantum Cryptographic Protocols," arxiv.org, 2004, pp. 1-9, retrieved from the internet:<URL:http://arxiv.org/PS_cache/guant-ph/pdf/0407/0407067v2.pdf>.

(Continued)

*Primary Examiner* — Ashok Patel
*Assistant Examiner* — Tracy Mangialaschi
(74) *Attorney, Agent, or Firm* — Antonelli, Terry, Stout & Kraus, LLP.

(57) ABSTRACT

Communications having high security against information leakage can be established in a current optical fiber network in the following manner. (1) A sender and a receiver share a seed key in advance, and then transmit and receive random numbers superimposed on carrier light accompanied with fluctuations, where transmission basis is determined by a random number. The sender and the receiver check a shared basis determined by the seed key with a random basis and employ only a random number signal superimposed on a slot for the shared basis that coincides with the random basis, and share the random numbers between the sender and the receiver. Here, since the carrier light has fluctuations, a bit error exists in the received signals. However, because of the seed key, a legitimate receiver can receive a signal with a bit error rate smaller than an eavesdropper. (2) The information amount of the random numbers shared between the sender and the receiver is reduced to secret capacity through privacy amplification, and then the reduced random numbers are set to be a secret key. (3) An actual signal is encrypted with the obtained secret key, and is transmitted and received.

20 Claims, 17 Drawing Sheets

(56) References Cited

U.S. PATENT DOCUMENTS

| | | | |
|---|---|---|---|
| 2006/0093143 A1* | 5/2006 | Maeda et al. | 380/256 |
| 2007/0064945 A1* | 3/2007 | Yuan et al. | 380/263 |
| 2008/0031637 A1 | 2/2008 | Tomaru | |
| 2008/0085121 A1 | 4/2008 | Tomaru | |

FOREIGN PATENT DOCUMENTS

| | | |
|---|---|---|
| JP | 2009-296217 | 12/2009 |
| JP | 2010-035072 | 2/2010 |

OTHER PUBLICATIONS

Gisin et al., "Quantum Cryptography," Reviews of modern physics, 2002, pp. 145-195, vol. 74, The American Physical Society.

Barbosa et al., "Secure Communication Using Mesocopic Coherent States," Physical review letters, 2003, pp. 227901-1-227901-4, vol. 90, No. 22, The American Physical Society.

Wyner, "The Wire-Tap Channel," The bell system technical journal, 1975, pp. 1355-1387, vol. 54, No. 8.

Maurer, "Secret Key Agreement by Public Discussion From Common Information," IEEE Transactions on information theory, 1993, pp. 733-742, vol. 39, No. 3.

Bennett et al., "Generalized Privacy Amplification," IEEE Transactions on information theory, 1995, pp. 1915-1923, vol. 41, No. 6.

Tomaru et al., "Secure Optical Communication Using Antisqueezing," Physical review, 2006, pp. 032312-1-032312-6, vol. 74, The American Physical Society.

Tomaru, "LD Light Antisqueezing Through Fiber Propagation in Reflection-Type Interferometer," Optics express, 2007, pp. 11241-11248, vol. 15, No. 18, Optical Society of America.

* cited by examiner

CRYPTOGRAPHIC COMMUNICATION SYSTEM

TECHNICAL FIELD

The present invention relates to an optical communication system and more particularly to a cryptographic communication system with improved security in optical communications.

BACKGROUND ART

The demand for confidentiality in communications has been a permanent theme for the future since ancient times. Advancements in cryptography have been satisfying the demand in the network society in recent years. Encryption can be broadly classified into a secret-key cryptosystem and a public-key cryptosystem. The basis for security in the secret-key cryptosystem is that decryption is not an easy task even if communications are intercepted. Meanwhile, the basis for security in the public-key cryptosystem is that decryption requires unrealistic time although the decryption algorithm is known. However, the secret-key cryptosystem has a risk that a decryption technique may be found. Meanwhile, the public-key cryptosystem has risks that a decryption technique faster than the currently known decryption algorithm may be found, and that description can be made relatively easily even with the current algorithm if a quantum computer is realized. For this reason, quantum cryptography has begun to attract attention.

The quantum cryptography aims to ensure security in accordance with the laws of physics by use of quantum-mechanical properties. Accordingly, even if advancements are made in decryption techniques or computers, the quantum cryptography is free from a concern to threaten the security because the quantum cryptography establishes the security in accordance with the laws of physics, while the normal cryptography establishes the security based on the difficulty in decryption even if it can be intercepted (Non-Patent Document 1). However, use of a quantum-mechanical state is requisite for the quantum cryptography, as a matter of course. The quantum-mechanical state easily changes from the original state due to an interaction with the environment (decoherence). Thus, there are many restrictions to apply the quantum cryptography to an actual communication system. There is always loss in a transmission channel such as an optical fiber, and such loss causes a change in the quantum state. Accordingly, the quantum cryptography is first restricted in transmission distance. The maximum transmission distance is, for example, about 100 km. If there is loss, amplification is used to compensate the amount of loss in normal communications, but amplification is not allowed in the quantum cryptography because the amplification causes decoherence in the original state. Furthermore, use of ultra-weak light is a characteristic of the quantum cryptography. There arises a problem that the current optical system needs to be rebuilt for operation of the quantum cryptography having such characteristics. As described above, it can be seen that there are many restrictions in the operation of the quantum cryptography.

A method that has been proposed with an aim to solve the aforementioned problems is called $\alpha\eta$ scheme. In the $\alpha\eta$ scheme, a signal basis is multi-valued in phase space, and bases adjacent to each other are set in a range of a quantum fluctuation for not giving an eavesdropper the correct information (Non-Patent Document 2). The basis for security in this scheme is the quantum fluctuation. Thus, if the signal light intensity is too large, the effect of the quantum fluctuation becomes ignorable, so that sufficient security cannot be obtained in this case. An optical intensity larger than the quantum cryptography can be used but the intensity needs to be sufficiently weak as compared with the intensity in normal optical communications. In this respect, a method using anti-squeezing is proposed as a method with which an optical intensity at a level of the normal optical communications can be applied (Patent Document 1). This method aims to make eavesdropping difficult by use of the multi-valued basis and the antisqueezed (expanded) fluctuation. The antisqueezed fluctuation is a fluctuation sufficiently made larger than the quantum fluctuation, so that the antisqueezed fluctuation can be said to be a classical fluctuation rather than the quantum fluctuation.

When the security of communications is considered based on the information theory, no distinction is made whether the signal light is quantum or classical (Non-Patent Documents 3 and 4). Secret capacity $C=I(X;Y)-I(X;Z)$ can be obtained as a difference between mutual information $I(X;Y)$ between a sender and a legitimate receiver and mutual information $I(X;Z)$ between the sender and an eavesdropper. The mutual information I is a function of a bit error rate (BER), and it is equal to source entropy $H(A)$ of the sender when there is no bit error and decreases with an increase in the BER. When the BER ($E_E$) of the eavesdropper is larger than the BER ($E_B$) of the legitimate receiver, the secret capacity ($C>0$) is ensured, and thus, secure communications in view of the information theory can be performed. The important point for achieving security in view of the information theory is how to establish $E_E>E_B$ by forming a difference between the legitimate receiver and the eavesdropper. In the quantum cryptography, there is a function allowing the legitimate sender and receiver to detect eavesdropping by use of the quantum-mechanical properties at the time of the eavesdropping, and $E_E>E_B$ is established by use of this function. Any part of the quantum cryptography other than the above does not use the quantum-mechanical properties. Thus, secure communications can be performed if there is a method that can establish $E_E>E_B$ without using the quantum-mechanical properties.

Patent Document 1: JP 2007-129386 A
Non-Patent Document 1: N. Gisin, G. Ribordy, W. Tittel and H. Zbinden, Rev. Mod. Phys. 74, 145-195 (2002).
Non-Patent Document 2: G. A. Barbosa, E. Corndorf, P. Kumar and H. P. Yuen, Phys. Rev. Lett. 90(2003) 227901.
Non-Patent Document 3: U. M. Maurer, "Secret key agreement by public discussion from common information," IEEE Trans. Inf. Theory, 39, 733 (1993).

SUMMARY OF THE INVENTION

Problems to be Solved by the Invention

Quantum cryptography is introduced as a technique to drastically improve security, but there are many problems in actual operation of the technique. One of methods to solve the problems is to use the carrier light accompanied by classical fluctuations such as antisqueezed light. However, how to form a difference between a legitimate receiver and an eavesdropper, which is required for establishing secure communications, is an unsolved problem. The present invention discloses a method for forming this difference by use of classical fluctuations.

Means for Solving the Problems

The difference between the legitimate receiver and the eavesdropper is formed by sharing a seed key between the sender and the receiver. Binary random numbers are transmitted with binary basis (n-ary signal with m-ary basis where n and m are each a positive integer, in general) by use of the carrier light accompanied with classical fluctuations. Which value of the binary basis is employed is also determined by a random number. In an ideal operation, the eavesdropper cannot receive any information because the signal is a random number with random basis. The legitimate transmitter and receiver share a time series of the basis for transmitting and receiving a random number signal using the shared seed key (shared basis). The legitimate receiver does not regard all the transmitted and received random numbers as the signals. The random basis is compared with the shared basis, bit by bit, and only when the random basis coincides with the shared basis, a random number superimposed thereon is regarded as a signal and it is shared between the legitimate sender and receiver. When the legitimate receiver checks the random basis with the shared basis, a judgment error occurs due to fluctuations of the carrier light. However, such an error is corrected by use of an error-correction code. Having the basis information, the legitimate receiver just needs to make a binary judgment using a single known basis in principle. However, without having the basis information, the eavesdropper has to make a binary judgment in the condition of binary basis. The eavesdropper sees the signal as a quaternary signal. The BER in a binary judgment for a quaternary signal is larger than the BER in a binary judgment for a binary signal. This is the difference between the legitimate receiver and the eavesdropper. The information amount corresponding to this difference is the source of the secret capacity. The secret capacity is corrected in accordance with the redundancy of the error correction code, and secret random numbers of the corrected secret capacity are generated through privacy amplification from the random numbers shared between the sender and the receiver. In this way, a secure secret key is obtained. Secure communications are established by cryptographic communications of actual signals by use of the obtained secure secret key.

Effects of the Invention

According to the present invention, a new encryption key (secret key) is generated from a seed key. In this method, although the seed key is used as the source, the security of the newly generated secret key is ensured in view of the information theory. Thus, there is no effective attack method except for exhaustive key search for the seed key. When the encryption cannot be attacked by any method more effective than the exhaustive key search for the seed key, the encryption is considered sufficiently secure. The present invention builds a sufficiently secure communication system in this context. Moreover, the fluctuations used in this invention are classical fluctuations, so that this method is resistant against loss and amplification and is not restricted in transmission distance unlike in the case of transmission of the quantum state. According to the present invention, secure communications can be performed over a long distance by use of an existing optical fiber network.

EXPLANATION OF THE REFERENCE NUMERALS

100 TRANSMITTER
111 to 114 RANDOM NUMBER GENERATOR
121, 122 SEED KEY
123, 124 PSEUDO-RANDOM NUMBER GENERATOR
131 to 134 BUFFER
141 ENCODER FOR ERROR-CORRECTING CODING
151 FLUCTUATED LIGHT SOURCE
161 MODULATOR
171 EQUIPMENT FOR PRIVACY AMPLIFICATION
181 ENCRYPTER
182 OPTICAL TRANSMITTER
183 MULTIPLEXER 201, 202 OPTICAL TRANSMISSION CHANNEL
300 RECEIVER
311 to 313 OPTICAL DETECTOR
321, 322 SEED KEY
323, 324 PSEUDO-RANDOM NUMBER GENERATOR
333, 334 BUFFER
341 DECODER FOR DECODING AN ERROR-CORRECTING CODE
371 EQUIPMENT FOR PRIVACY AMPLIFICATION
381 OPTICAL DETECTOR
382 DECRYPTER
383 DEMULTIPLEXER
1510 LASER
1520 FLUCTUATION GENERATOR
1521 OPTICAL AMPLIFIER
1522 BAND PASS FILTER
1523 OPTICAL FIBER
1524 CIRCULATOR
1525 FARADAY MIRROR
1530, 1630 FLUCTUATION SOURCE

MODES FOR CARRYING OUT THE INVENTION

To begin with, before specific embodiments are described, a description will be given of general matters that serve as the points of the embodiments. In order to improve the security of communications by the present invention, it is important that the signal light have fluctuations. Although the complex nature of the protocol increases the decryption difficulty for the eavesdropper even without any fluctuations, the fluctuations are important for obtaining sufficient security. The fluctuations of light can be classified into amplitude and phase fluctuations. The present invention is effective in either type of fluctuations. However, the invention in the case of the phase fluctuations will be mainly described as an example in the following embodiments. Since the phase fluctuations are used, a phase modulation is used as the modulation scheme. Either phase-shift keying (PSK), which requires reference light, or differential-phase-shift keying, which is a differential type, may be used. For the sake of simplicity, a binary signal is used while the number of bases is set to two. In this case, the signal appears to be quaternary. However, the present invention allows the signal to be easily expanded into an n-ary signal with m-ary basis where n and m are each a positive integer. In this case, the signal appears to be n×m-ary.

Figure 1:
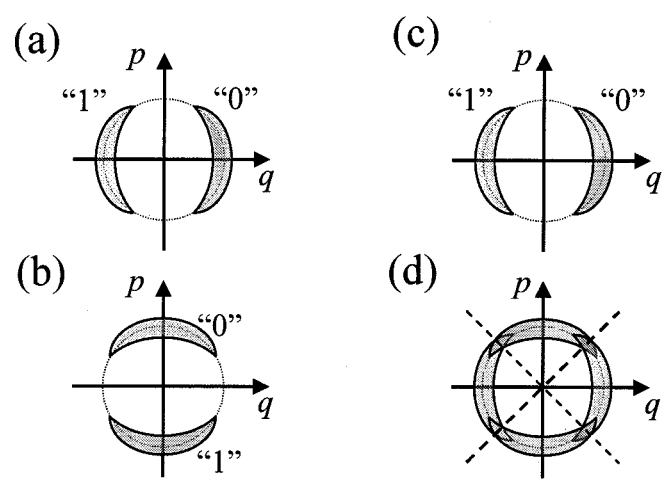
FIG. 1 is a diagram showing physical principles of the present invention.

In order to achieve secure communications, a situation where the legitimate receiver has an advantage over the eavesdropper needs to be created. The principle to achieve this situation is shown in FIG. 1. It is assumed that the legitimate sender and receiver share a seed key in advance. Whether the signal is on a q-axis basis or a p-axis basis is determined by use of the seed key. FIG. 1 (a) shows a binary signal in the case of the q-axis basis, and the crescent shapes show the fluctuations of the respective signal states of "0" and "1" in phase space. If the absolute value of amplitude of the signal light is E, the signal "0" corresponds to (q, p)=(E, 0), and the signal "1" corresponds to (q, p)=(−E, 0). However, when the signal light is measured, the measured value shows (q, p)=(E+δq, δp) when the signal is "0" and (q, p)=(−E+δq, δp) when the signal is "1," according to the fluctuations of carrier light δq and δp. The crescent shapes in each of FIG. 1 show the ranges of the fluctuations, and a measured value substantially becomes any point within a corresponding one of the ranges. FIG. 1 (b) shows a binary signal in the case of the p-axis basis.

The legitimate receiver is capable of judging the correct basis using the seed key and thus always capable of making a binary judgment for the fluctuated state in principle as shown in FIG. 1 (c), but the eavesdropper sees the signal as a quaternary signal as shown in FIG. 1 (d) because the eavesdropper does not have the seed key. In the case of the quaternary signal, an overlapping portion of adjacent fluctuations is large, so that the BER of the eavesdropper increases. Although a slight amount of bit error occurs in the case of the legitimate receiver, the difference from the amount thereof in the case of the eavesdropper is obvious. This difference in the bit error rate gives the secret capacity. The important point here is that the eavesdropper has to make a binary decision from a quaternary signal while the legitimate receiver can make a binary decision from a binary signal. This difference generates the difference in the bit error rate. However, if the same key is continuously used without any change, the eavesdropper may estimate the basis. Thus, development of a protocol not allowing the estimation of the basis is the subject, and the present invention provides a solution to the subject.

Figure 2:
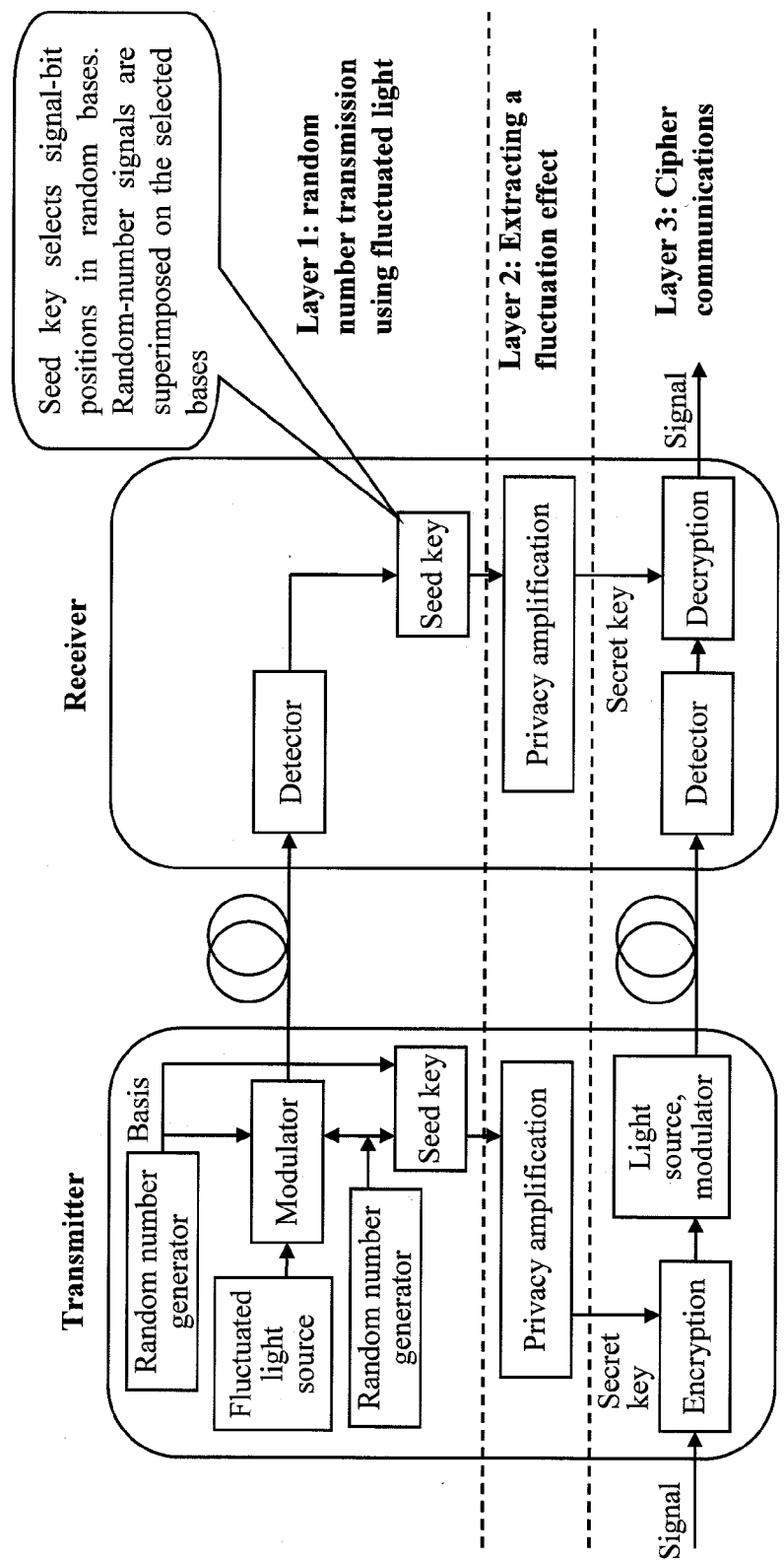
FIG. 2 is a block diagram showing a principle for implementing the present invention.

FIG. 2 shows an overall image of a communication protocol according to the present invention. In a layer 1, random numbers are transmitted and received using fluctuated light. The secret capacity is determined by the difference in BER between the legitimate receiver and the eavesdropper. Next, the information amount of random number data is reduced to the secret capacity through privacy amplification and a secret key is generated in a layer 2 (C. H. Bennett, G Brassard, C. Crepeau, and U. U. Maurer, "Generalized privacy amplification," IEEE Trans. Inf. Theory 41, 1915 (1995)). A layer 3 shows a normal signal transmission channel, and cipher communications of the actual signal are performed via the layer 3, using the secret key obtained in the layer 2. The fluctuated light does not have to be used in the layer 3.

In the layer 1, random numbers are transmitted and received with a random basis. In principle, the signal in the layer 1 is formed of only true random numbers including the basis, so that even if the signal is received in an illegitimate manner, no information leaks out. However, there is redundancy of the signal because of an error correcting code to be described later, so that correction of the information amount is required due to this redundancy. The legitimate sender and receiver share a shared basis determined by the seed key in advance, and employ, as a random number signal, only data of a slot that matches the shared basis with a random basis. Since the legitimate receiver also detects signals with bit errors, the actual processing is somewhat complicated as shown in the following specific embodiment. However, in principle, a binary judgment is made for a binary signal with the help of the seed key. Since the eavesdropper has to make a binary judgment for a quaternary signal, the eavesdropper has to receive random number data based on a BER that is disadvantageous as compared with the legitimate receiver. The difference between the BERs generates the secret capacity for the legitimate sender and receiver, and the secret key can be obtained through privacy amplification (layer 2). The obtained secret key is one that is extracted from the communication result using the seed key, but is based on the difference in BER between the legitimate receiver and the eavesdropper. Thus, the extraction process in this case is based on the information theory, and this point is important.

The layer 3 is a normal communication channel and may be exposed to various types of attacks such as a known-plaintext attack, a chosen-plaintext attack and the like. In addition, in the layer 1 the quaternary signal may be eavesdropped on in an illegitimate manner although bit errors exist. Accordingly, it seems at a glance that a ciphertext may be decrypted by checking the results illegally received via the layer 1 and the layer 3 with each other. However, in the method according to the present invention, the secret key is extracted on the basis of the difference between the BERs of the legitimate receiver and the eavesdropper, so that the results illegally received via the layer 1 and the layer 3 are uncorrelated in view of the information theory. Since the layer 1 is used for transmission and reception of only a random number signal, the eavesdropper cannot receive data such as a correspondence relationship between a ciphertext and a plaintext. What the eavesdropper can receive is only a true random number sequence except for a redundancy portion of the error-correcting code. When the information amount of the redundancy portion is removed by privacy amplification, there is no effective decryption technique except for exhaustive key search for the seed key. In order to achieve decryption of the eavesdropped data with an attack method more efficient than the exhaustive key search, the eavesdropper needs to be capable of detecting a random number signal in the same BER as that of the legitimate receiver in the layer 1 at least. If this condition is met, there may be a correlation between the results of illegally received via the layer 1 and the layer 3.

If there is no effective attack method except for the exhaustive key search for the seed key, the threat that a decryption technique may be discovered no longer exists, and the security can be evaluated by only computation time for the exhaustive key search (brute force attack). The method according to the present invention provides security improved by one level higher than the normal encryption in this meaning.

Hereinafter, embodiments of the present invention will be described in detail.

FIRST EMBODIMENT

Figure 3:
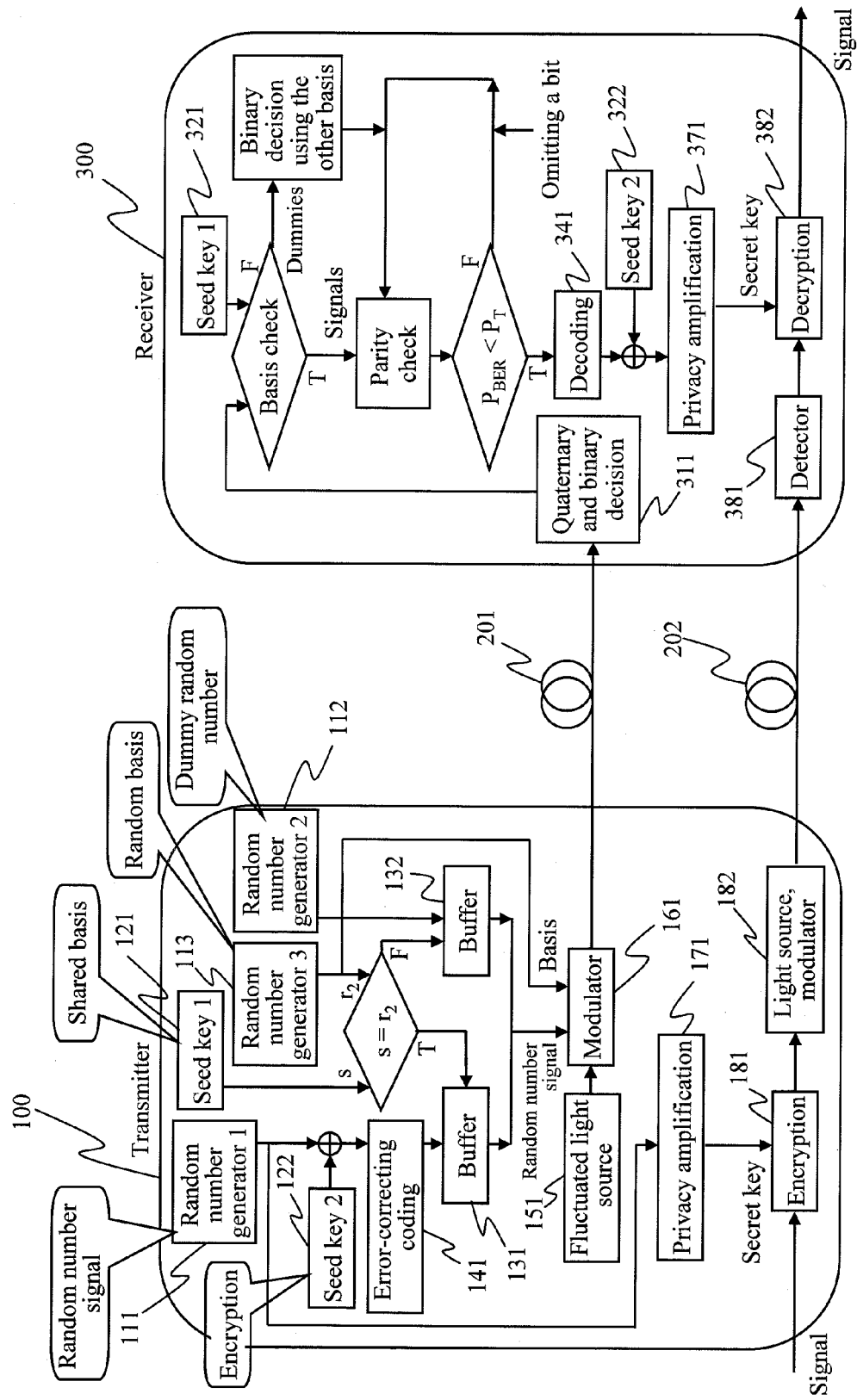
FIG. 3 is a block diagram showing a configuration example of a cryptographic communication system according to the present invention.

If both the basis and signal are true random numbers, the eavesdropper only sees a completely random signal sequence. FIG. 3 shows a configuration example of a cryptographic communication system according to the present invention. Three random number generators (111, 112 and 113) and seed keys (121 and 122) of two types, each of which is made of random numbers, are arranged in a transmitter 100. The random number generators and the seed keys may be the one that the output from a single random number generator is divided into three parts and a seed key of one type is divided into two parts. The outputs of the random number generator 1 (111) correspond to random numbers that become a signal for generating a secret key. The random numbers are then encrypted by use of a seed key 2 (122), are error-correcting coded in encoder 141, and are prepared in a buffer 131 for transmission. The output of the random number generator 2 (112) is prepared in a buffer 132 as random numbers for a dummy signal. The random number generator 3 (113) determines a transmission basis, and signal transmission via the layer 1 is performed according to this random basis. In order for the legitimate receiver to correctly receive the signal, the basis shared between the legitimate sender and receiver needs to be used. For this reason, the seed key 1 (121) is used. The basis is made completely random by the random number generator 3 (113), but instead of adopting all the transmitted and received random numbers as the signal, only a random number of a case where a random basis coincides with the basis determined by the seed key 1 (121) is adopted. Thus, the sequence of bases seems random for the eavesdropper, but seems to have a pattern for the legitimate receiver.

Figure 4:
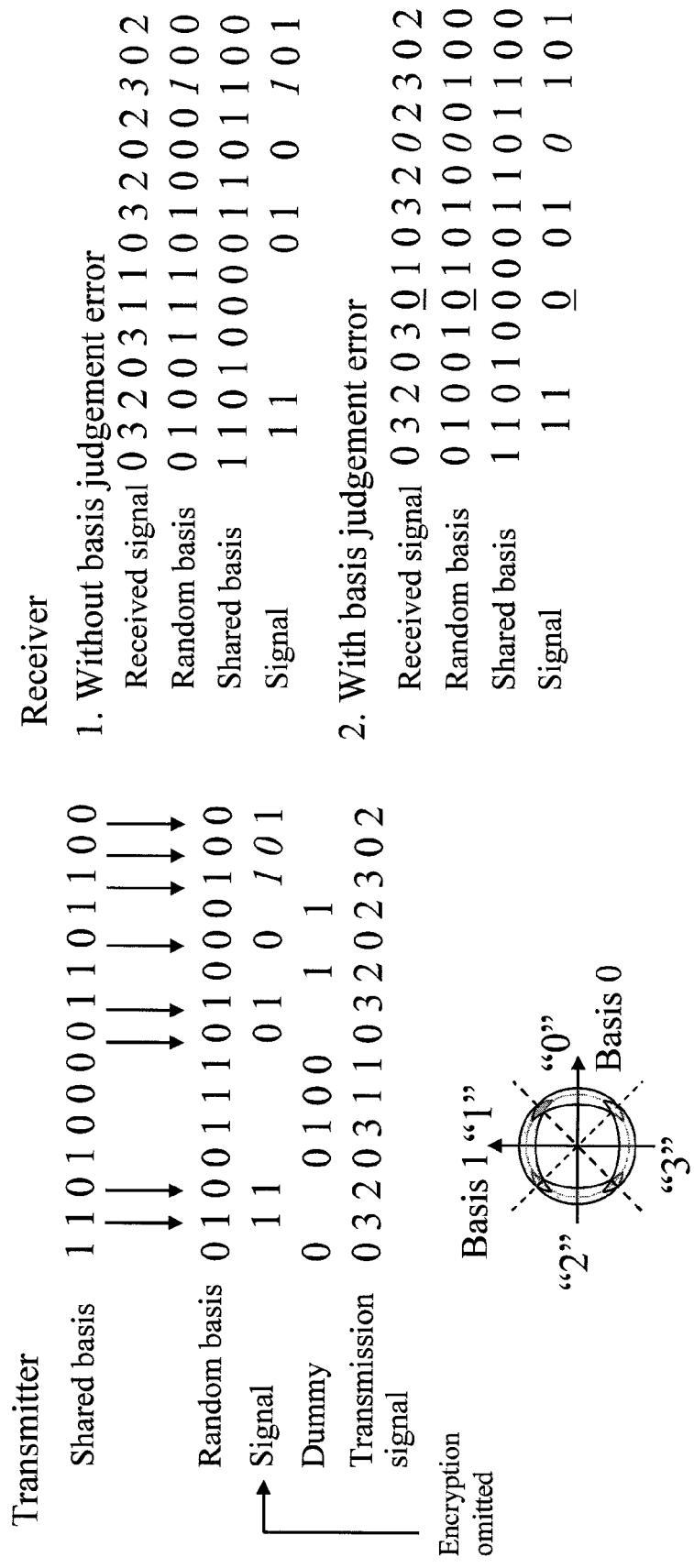
FIG. 4 is a diagram showing signal examples in a case where the present invention is implemented on the basis of the block diagram in FIG. 3.

FIG. 4 shows a specific example of the radon number signals and dummy random numbers to be processed in the aforementioned scheme. In order to specify the basis, the q-axis basis of FIG. 1 is set to "0" while the p-axis basis thereof is set to "1." The random bases determined by the outputs of the random number generator 3 (113) are set to 010011101000100 as shown in FIG. 4. Meanwhile, the bases shared in advance between the sender and the receiver are set to 110100001101100. In FIG. 4, the first basis of the shared bases is "1" but the first basis of the random bases determined by random number generator 3 is "0," and thus, the first bases do not coincide with each other. In this case, a dummy random number (waiting in the buffer 132) is superimposed on the basis "0" and is transmitted. The random numbers are superimposed on the output light from a fluctuated light source 151 in a modulator 161. The second output of the random bases (random number generator 3 (113)) is "1" and coincides with the second output of the shared bases in this case. Thus, the random number signal (waiting in the buffer 131) is superimposed and is transmitted. The next shared basis and random basis are both "0," so that the random number signal is subsequently superimposed and is transmitted. The same processing is repeated thereafter.

In this scheme, which of the random number signal and the dummy random number are superimposed is determined depending on the output of the random bases (random number generator 3 (113)). Thus, the buffer 131 and the buffer 132 are provided to adjust timing, and the random number signals and the dummy random numbers wait therein as shown in FIG. 3. The signal (random number signal and dummy random number) is binary and the basis is also binary, so that the signal to be transmitted is quaternary as a net. Allocation on the quaternary signal in phase space is shown in a lower left portion of FIG. 4. In the field "transmission signal" in FIG. 4 shows the quaternary signal values. The random numbers in the field "signal" are the random number signal, and the random numbers in the field "dummy" are the dummy random numbers. Note that, the random number data is error-correcting coded in encoder 141 for correcting bit errors that occur with respect to the legitimate receiver.

The signal (random number signal and dummy random number) is transmitted through an optical transmission channel 201 and received by a detector 311 in a receiver 300. In the detector 311, a quaternary judgment and a binary judgment are made simultaneously. This processing is easy. Two sets of homodyne detectors are used to measure two orthogonal phase components (q-axis component and p-axis component). Output values $I_q$ and $I_p$ of each of the homodyne detectors that are subjected to binary judgments (whether each component is positive or negative) correspond to the results of the binary judgments for the respective bases. Quaternary judgments ("0," "1," "2," "3": refer to FIG. 4) can be made if phases $\phi$ are determined by arctan $(I_p/I_q)$ from the output values $I_q$ and $I_p$ of the two sets of the homodyne detectors. Since the bases are randomized, the signal state seems to be a random quaternary signal also to the legitimate receiver. In this respect, a quaternary judgment is first made to determine which basis is used. The random basis is judged in such a way that the basis is "0" when the result of the quaternary judgment is "0" or "2," and the basis is "1" when the result of the quaternary judgment is "1" or "3." The judged basis is checked with the shared basis determined by the seed key 1 (321) (the same seed key as the seed key 1 (121) in the transmitter). If the basis coincides with the shared basis, the superimposed signal is judged as a random number signal and if the basis does not coincide with the shared basis, the superimposed signal is judged as a dummy random number. An example of the above described processing in the receiver is shown on the right side of FIG. 4. However, the basis judgment according to quaternary judgments makes many errors, i.e., there are many judgment errors in checking the random bases with the shared bases.

In order to correct these errors, a parity check function for an error-correcting code embedded in the random number signal is used. If there is no error in the checking of the random bases with the shared bases, the BER of the random number data becomes a previously estimated small value. However, if there is an error in the checking, the bit at which the error has occurred and the bits thereafter result in a bit error with a probability of ½. Accordingly, the position where the bit error has started can be approximately identified by the parity check. The position where the bit error has started is the position where a dummy random number is inserted or a random number signal is dropped. Therefore, the bit at the position where the bit error has started is omitted, or the bit that has been judged originally as a dummy and thus discarded is returned, and parity is again checked. This process is repeated sequentially for all suspected bits, and thereby, a bit sequence having almost no bit error is found.

A specific example of a case where there is a bit error is shown in FIG. 4. For the sake of simplicity, let us consider a case where a simple parity check bit is inserted in encoder 141. Let us suppose that the random number data are divided into five bits each, and a parity check bit of "1" if the number of bits "1" is odd or a parity check bit of "0" if the number of bits "1" is even is inserted into the sixth bit as a result. The random number signal is shown in the field "Signal" on the transmitter in FIG. 4, and is 11010101. The parity for the first five bits from left is inserted at the sixth bit. In FIG. 4, the parity bits are shown in italics. If there is no bit error in the receiver, the parity calculated from the received random number signal coincides with the value of the parity bit. Let us suppose that a judgment error of the random bases in the receiver occurs at the sixth bit from left in FIG. 4. In the example of the receiver in FIG. 4, the bits underlined correspond to the judgment error. In this case, the bit that is not actually a signal bit is treated as a signal bit, so that the random numbers corresponding to signals are increased by one bit. As a result, the position of the parity check bit is shifted by one bit (the bit recognized by the receiver as the parity bit is shown in italics in the receiver in FIG. 4. The parity bit is shifted by one bit between the cases with and without a bit error).

When the receiver performs parity check without knowing that one bit has been shifted, the parity does not match by a probability of ½ at the bit where the bit error occurs and the bits following the bit. Thus, the position where the bit error has occurred can be substantially determined. Change of basis judgment is repeated for every bit that is supposed to be an error until a bit sequence with which the parity becomes substantially normal is found. In the example of the receiver in FIG. 4, the underlined bits are the error ones, and deletion of this bit from random number signals allow the bit sequence to return to the error-free state. In a case where a bit that has been originally judged as a dummy and thus discarded is returned, the basis judgment is corrected through this return process because the original basis judgment is wrong. The signal judgment in this case is binary because the basis is definite. In this scheme, the receiver first makes a quaternary judgment, but the processing reduces it to a binary judgment through the process of correcting the basis judgment error. In the case of a binary judgment, the BER becomes small as compared with the case of a quaternary judgment. This difference is the factor that the legitimate receiver has an advantage over the eavesdropper in view of the information theory, and such an advantage is given by the seed key 1 (121 and 321) shared between the sender and the receiver in advance.

When the bit errors are almost removed, and the BER is reduced to a value with which error correction is possible, the error-correcting code is decoded (341), and decryption by the seed key 2 (322) is performed. Thus, the outputs of the random number generator 1 (111) in the transmitter are reproduced in the receiver. In order to generate the final secret key, the difference in the information amount determined by the difference between the BERs for a binary judgment (legitimate receiver) and for quaternary judgment (eavesdropper) is corrected by the redundant amount in the error-correcting code. The amount of the random numbers shared between the sender and the receiver is reduced according to the corrected secret capacity through the privacy amplification (171 and 371).

The privacy amplification can be achieved through a logical operation, for example. Let us suppose that 20% of the random numbers shared between the sender and the receiver is the secret capacity and that the shared random numbers are "01001 01110." When every five bits are exclusively ORed, the result is "01." In this processing, all the data is equally treated, and the information amount is reduced to 20%. This is an example of the privacy amplification.

Figure 5:
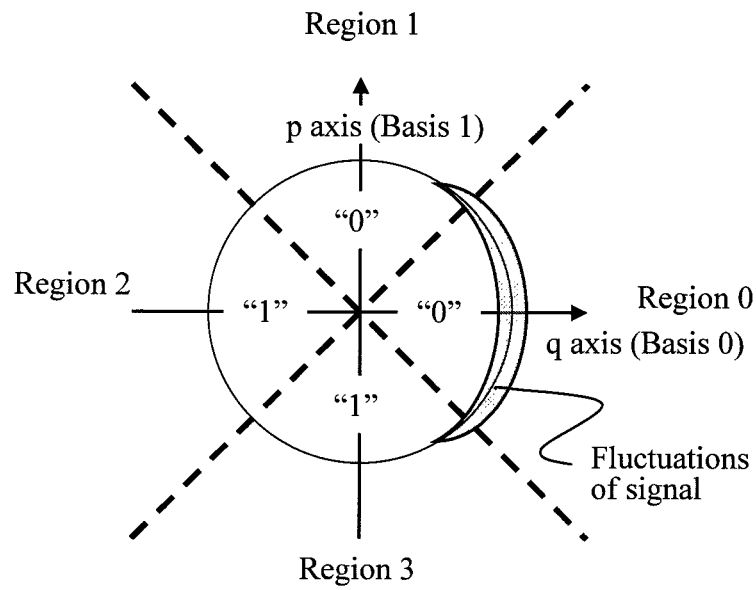
FIG. 5 is a diagram showing the region of each signal value and fluctuations of a signal state in phase space.

The BERs of the legitimate receiver and the eavesdropper can be estimated in the following manner. The directions of "0" and "1" for each of the bases are allocated in FIG. 5. When the signal state is taken in the signal "0" of the q-axis basis (basis "0"), the legitimate receiver who knows that the signal state is in the q-axis basis may judge whether the measurement value is on the right side or on the left side in phase space where p-axis is the boundary. In a case where the legitimate receiver obtains the measurement value in the negative region of the q-axis with respect to the signal "0," the measurement becomes a bit error. When fluctuations are distributed sufficiently larger than a quantum fluctuation, and also, a classical treatment in measurement is possible, the BER of the legitimate receiver is described by Equation (1) below if the probability distribution of the signal "0" of the q-axis basis is given by function P (θ) with respect to the phase.

$$E_B = \int_{-\pi}^{-\pi/2} P(\theta) d\theta + \int_{\pi/2}^{\pi} P(\theta) d\theta \tag{1}$$

The eavesdropper makes a binary judgment from the signal that seems to be quaternary, and thus judges the signal to be the signal "0" if the measurement values are found in a region 0 and a region 1. The case where the measurement values are found in a region 2 and a region 3 with respect to the signal "0" corresponds to a bit error. The BER of the eavesdropper is given by Equation (2) below.

$$E_E = \int_{-\pi}^{-\pi/4} P(\theta) d\theta + \int_{\pi/4}^{\pi} P(\theta) d\theta \tag{2}$$

If the probability distribution P (θ) of fluctuations is given by Equation (3) using the size δθ of the fluctuations, the bit error rate $E_B$ of the legitimate receiver and the bit error rate $E_E$ of the eavesdropper can be found specifically.

$$P(\theta) = \sqrt{\frac{2}{\pi}} \frac{1}{\delta\theta} \exp\left[-2\left(\frac{\theta}{\delta\theta}\right)^2\right] \tag{3}$$

Figure 6:
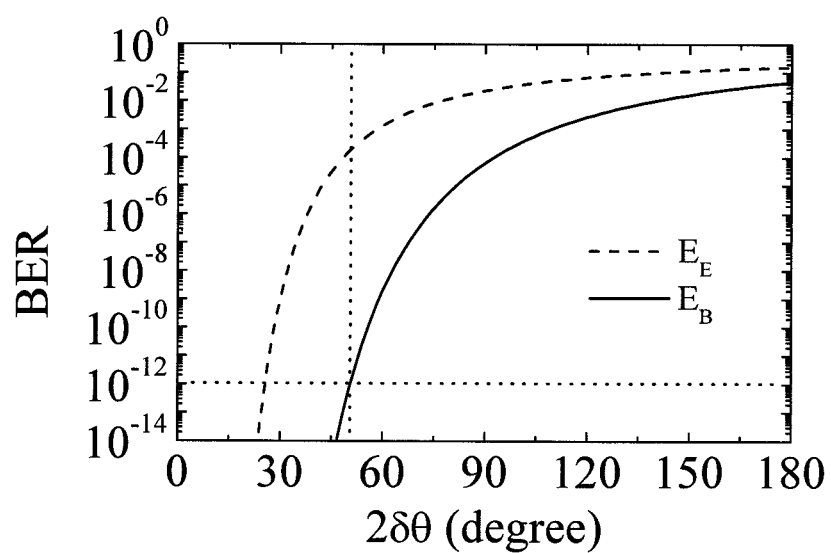
FIG. 6 is a diagram showing examples of plots showing the bit error rates of a legitimate receiver and an eavesdropper.

FIG. 6 shows a graph obtained by plotting $E_B$ and $E_E$ using 2δθ as the variable. If the fluctuation of a Gaussian distribution is set in such a way that the BER of the legitimate receiver should become $10^{-12}$, the BER of the eavesdropper becomes approximately $10^{-4}$.

The error-correcting coding (141) performed on a random number signal (111) does not have to be capable of correcting an error of a case where a quaternary judgment (a binary judgment in the condition of two bases) is made. In the process of checking the bases in the receiver, it is sufficient to find the position where bit errors successively occur. If the bit at the starting point of the successive bit errors can be identified, the error is corrected and the BER is reduced to a value with which binary judged results (binary judgment in the condition of a single basis) can be error-corrected. On the other hand, if error correction is possible for quaternary judged results (binary judgment in the condition of two bases), the difference in BER between the legitimate receiver and the eavesdropper cannot be used. To put it more specifically, the difference between the legitimate receiver and the eavesdropper, which is ensured in accordance with the information theory, no longer exists. Accordingly, in order to form the difference between the legitimate receiver and the eavesdropper in accordance with the information theory in the protocol, the capability of the error-correcting code performed on the random number signal needs to be sufficient for the legitimate receiver who makes a binary judgment in the condition of a single basis (BER is equal to $10^{-12}$, for example), and needs to be insufficient for the eavesdropper who needs to make a binary judgment in the condition of two bases (BER is equal to $10^{-4}$, for example). Furthermore, it is desirable that the error-correcting code should be designed so as to be capable of determining as easily as possible the starting point of the successive bit errors that have occurred during the process of checking the bases.

The signals transmitted and received via the layer 1 are random numbers, and the bases are also determined by true random numbers. The seed key 2 (122) is used for encrypting the random number signals, but the eavesdropper cannot guess the seed key 2 (122) because the signals are the random numbers. The seed key 1 (121) for determining the shared bases are also buried in the random bases, so that the eavesdropper cannot guess the seed key 1 (121) either. The eavesdropper cannot obtain meaningful information via the layer 1. Thus, the difference between the BERs for the legitimate receiver and the eavesdropper gives the secret capacity. However, correction needs to be made by the redundant portion of the error-correcting code. If the privacy amplification 171 in the transmitter 100 and the privacy amplification 371 in the receiver 300 perform an arithmetic operation by use of the same algorithm, a common secret key is formed between the transmitter and the receiver.

The actual signals are encrypted with encrypter 181 using the secret key generated in the transmitter, and are superimposed on the carrier light in an optical transmitter 182, and then transmitted to the receiver 300 via an optical transmission channel 202. The optical transmitter 182 is formed of a light source and a modulator configured to modulate the output light of the light source.

The receiver 300 receives the transmitted signal light via an optical detector 381, then converts the signal light into an electric signal and decrypts the electric signal in decrypter 382 using the secret key. In the manner described above, the series of processes for performing secure cryptographic communications ends.

The carrier light accompanied with fluctuations does not have to be used for the communications performed via the optical transmission channel 202. Normal optical communications may be used, instead. The optical transmission channels 201 and 202 may be physically different, or wavelength-division multiplexing may be performed by use of the same optical transmission channel.

SECOND EMBODIMENT

Figure 7:
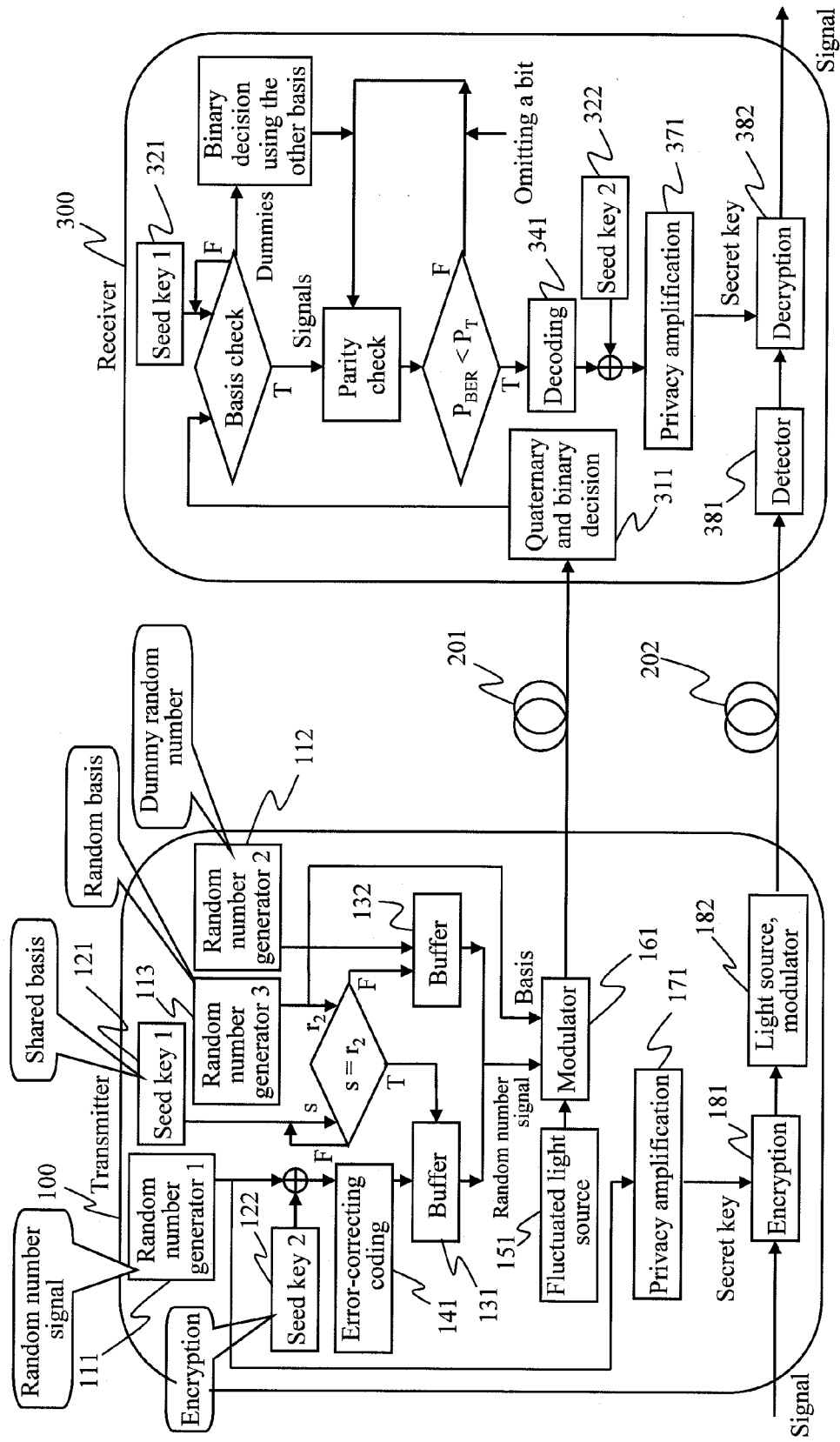
FIG. 7 is a block diagram showing a configuration example of a cryptographic communication system according to the present invention.

In the first embodiment, the random basis and the shared basis are compared with each other, bit by bit, and whether to transmit a random number signal or a dummy random number is determined. The method for comparing a shared basis with random bases does not have to be the one described in the first embodiment, and a method other than the one described in the first embodiment may be used. FIG. 7 shows a configuration example of a cryptographic communication system for achieving the method. In this embodiment, similar to the first embodiment, whether to transmit a random number signal or a dummy random number is determined by checking a random basis with a shared basis. However, when a shared basis and a random basis do not coincide with each other, the method in the second embodiment is different from that in the first embodiment. In this case a dummy random number is transmitted as similar to the process in the first embodiment, but the dissident shared basis is again checked with the next random basis, and the result determines whether to transmit a random number signal or a dummy random number in the next bit. The shared basis is checked with the random bases until the shared basis and the random basis coincide with each other. To put it differently, an operation is performed in such a way that the sequence of the bases on which a random number signal is superimposed coincides with the sequence of the shared bases.

Figure 8:
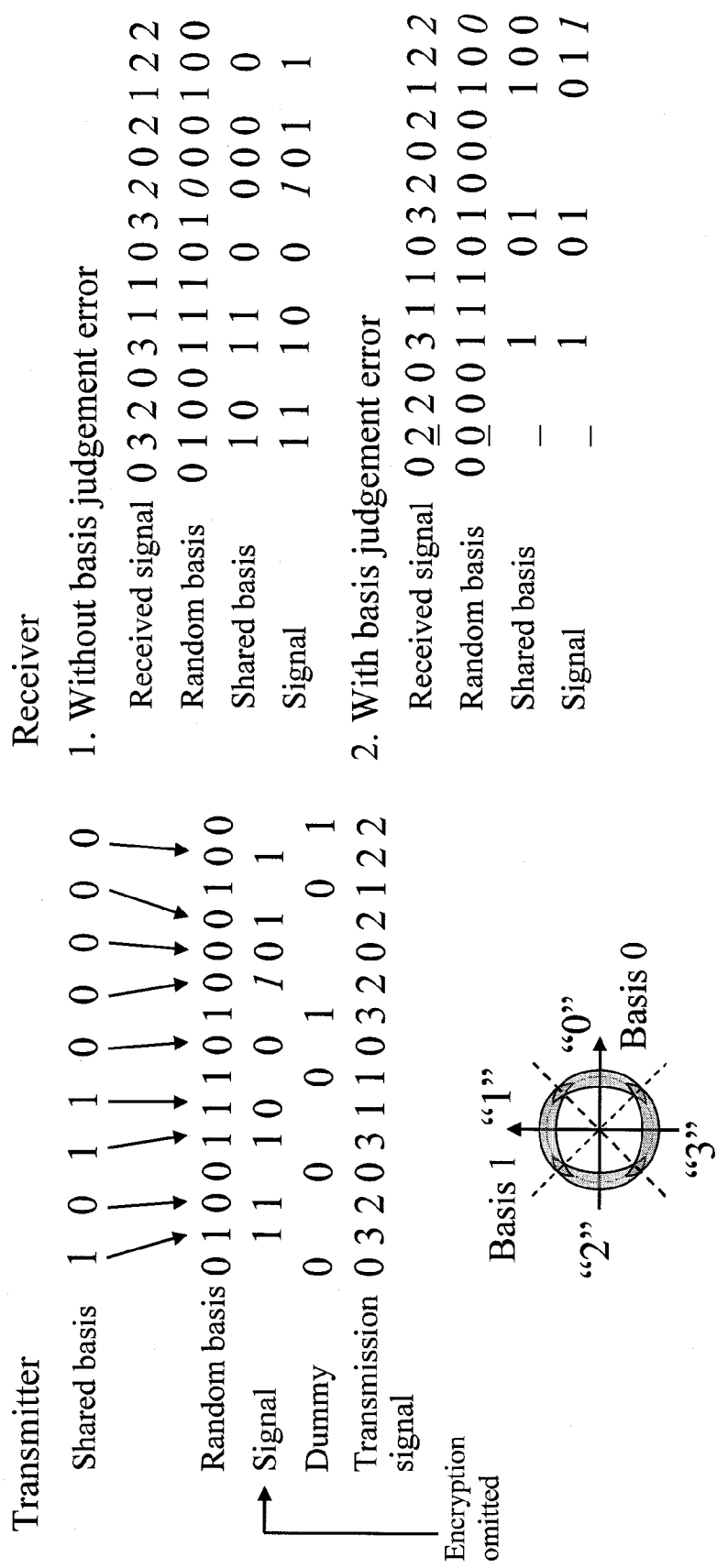
FIG. 8 is a diagram showing signal examples in a case where the present invention is implemented on the basis of the block diagram in FIG. 7.

FIG. 8 shows a specific example of the aforementioned scheme. The random bases determined by the outputs of the random number generator 3 (113) are 010011101000100 in FIG. 8. Meanwhile, the bases shared in advance between the sender and the receiver by the seed key 1 (121, 321) made of random numbers are 101100000. In the transmitter, transmission of the random number signal with the sequence of the bases determined by the shared bases is prepared first. In the example in FIG. 8, the first basis of the shared bases is "1" but the first basis of the random bases determined by the random number generator 3 (113) is "0" and does not coincide with "1." Thus, the dummy random number (an output of the random number generator 2 (112)) is superimposed on the basis "0" in this case and is transmitted. The shared basis "1," which does not coincide with "0," is again checked with the next random basis. The second output of the random bases (the random number generator 3 (113)) is "1" and coincides with the first basis of the shared random bases, "1." Thus, the random number signal is superimposed on the basis and is transmitted. The random number signal is error-correcting coded as in the case of the first embodiment, and a parity bit of every five bits is added as in the case of the first embodiment as a simple example. In the transmitter in FIG. 8, the parity bit is shown in italics.

The processing in the receiver 300 is modified from the processing according to the first embodiment on the basis of the modification in the processing in the transmitter 100. Firstly, which one of the two bases is used is judged through a quaternary judgment. This is the same as the scheme according to the first embodiment. The judged basis is then checked with the shared basis, and if the basis coincides with the shared basis, the random number datum is adopted. If the basis does not coincide with the shared basis, the random number datum is treated as a dummy. The shared basis that does not coincide with the random basis is again checked with a random basis determined from the next received signal. If the shared basis coincides with the random basis, the basis and the random number datum are adopted. In a case where there is a basis judgment error, the parity at the position and thereafter result in an error with a probability of ½. Accordingly, the position where the judgment error has occurred can be substantially identified. The position where the judgment error has occurred is the position where a dummy random number is inserted or a random number signal is dropped. Thus, the following parity checks are performed sequentially: (1) A bit near the position where the judgment error has occurred is omitted; the basis is again checked at the position and thereafter; and parity is checked. (2) The bit that has been judged as a dummy and thus discarded near the position where the judgment error has occurred is returned; the basis is again checked at the position and thereafter; and parity is checked. These processes are repeated for all suspected bits, and a bit sequence having almost no bit error is found. Examples of the cases where there is a bit error and where there is no bit error are shown on the right side of FIG. 8. In the example, the basis checking of the second bit from left results in a judgment error (indicated by an underline in the receiver), and the random number signal that is to become the shared random number actually is judged as a dummy random number by an error. For this reason, the number of signal bits is decreased, and the position of the parity bit is shifted. In the meantime, the shared random numbers become quite different. The example in FIG. 8 shows how the slot positions of the shared random numbers are changed. The slot positions of signals are completely different from the original form, when there is a basis judgment error. In this case, the parity bit at the position and thereafter results in an error with a probability of ½, and the position where the bit error has occurred is substantially found. If the position of the bit error can be approximately identified, the bits around the position are checked bit-by-bit and corrected. The correction is repeated until all bit errors are substantially corrected, and the BER with which decoding the error-correcting code is possible is formed.

In the scheme according to the second embodiment, if insertion or removal of a signal bit is performed according to a basis judgment error in the receiver, the basis checking after this position needs to be performed again. Thus, the scheme according to the second embodiment has a disadvantage that the amount of processing is larger than that of the scheme according to the first embodiment, but has an advantage that the sequence of the shared bases is determined completely by the seed key alone.

THIRD EMBODIMENT

In order to prevent giving the eavesdropper meaningful information via transmission and reception of random numbers via the layer 1, the bases as well as signals need to be determined by random numbers. However, the process of extracting shared bases from random bases is somewhat complicated even for the legitimate receiver as observed in the first and second embodiments because of a bit error. This process is desirably achieved by an easier method in view of the actual operation. A system for achieving the desire is a cryptographic communication system shown in FIG. 9.

Figure 9:
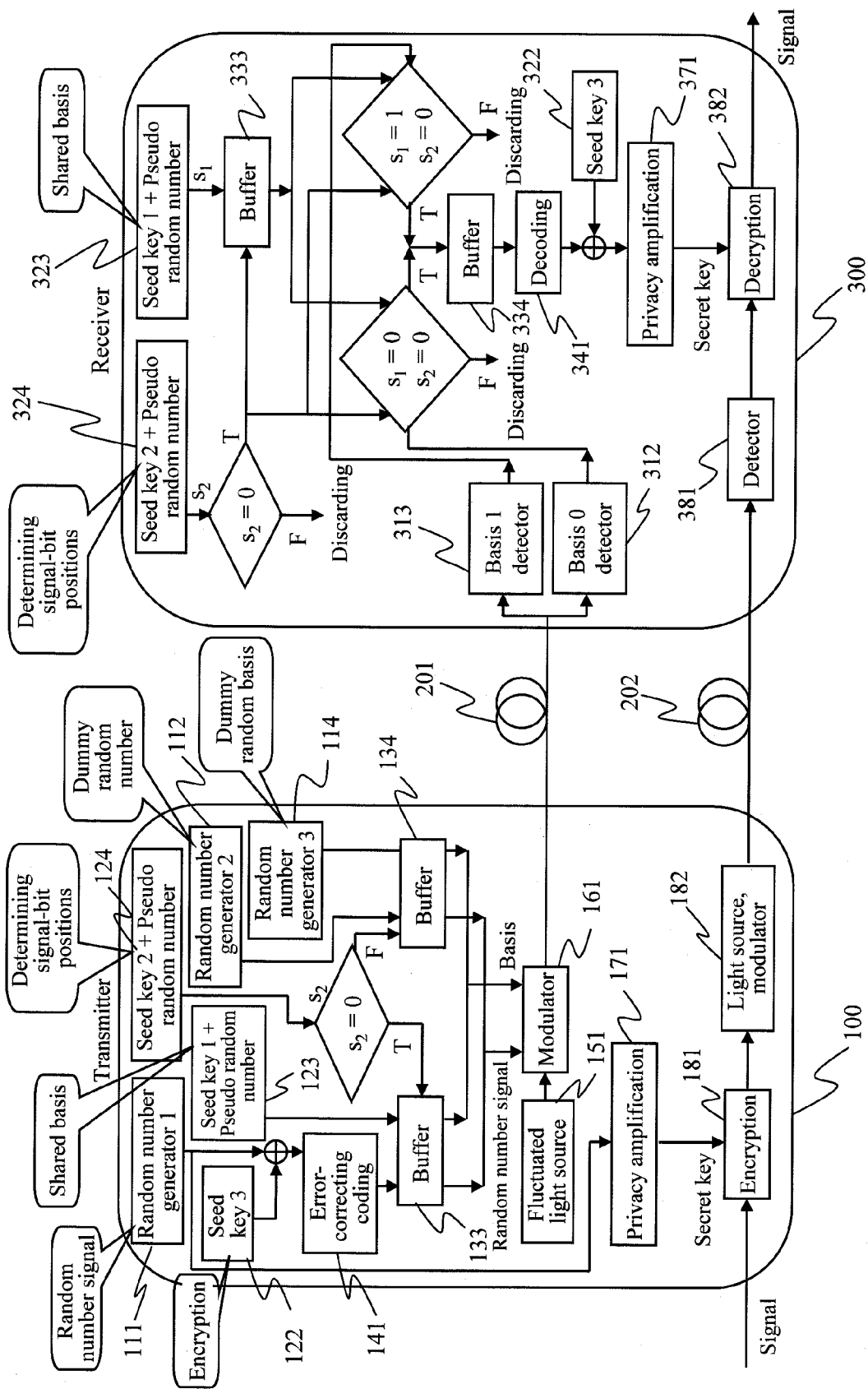
FIG. 9 is a configuration example of a cryptographic communication system according to the present invention.

In the protocol shown in FIG. 9, three random number generators (111, 112 and 114) and three seed keys (122, 123 and 124) each of which is made of random numbers are used. As in the case of the first embodiment, there is another method in which a single random number generator is used by dividing the output of the single random number generator into three parts, and a single seed key is used by dividing the seed key into three parts. In the first embodiment, the slots for transmitting random number signals and the slots for transmitting dummy random numbers are determined by true random numbers by use of the random number generator 3 (113) in the first embodiment, but are determined by a pseudo-random number generator 124 in this embodiment. The bases of the slots for transmitting the random number signals (outputs of the random number generator 1 (111)) use the shared bases determined by a pseudo-random number generator 123, and the bases of the slots for transmitting the dummy random numbers (outputs of the random number generator 2 (112)) are determined by the random number generator 3 (114). In this embodiment, the sender and the receiver determine which slots are used for random number signals by the seed key 2 (pseudo-random number generator 124) that are shared in advance. The transmission bases are no longer true random numbers, so that security may be degraded as compared with the first and second embodiments, but data processing is made easy.

Figure 10:
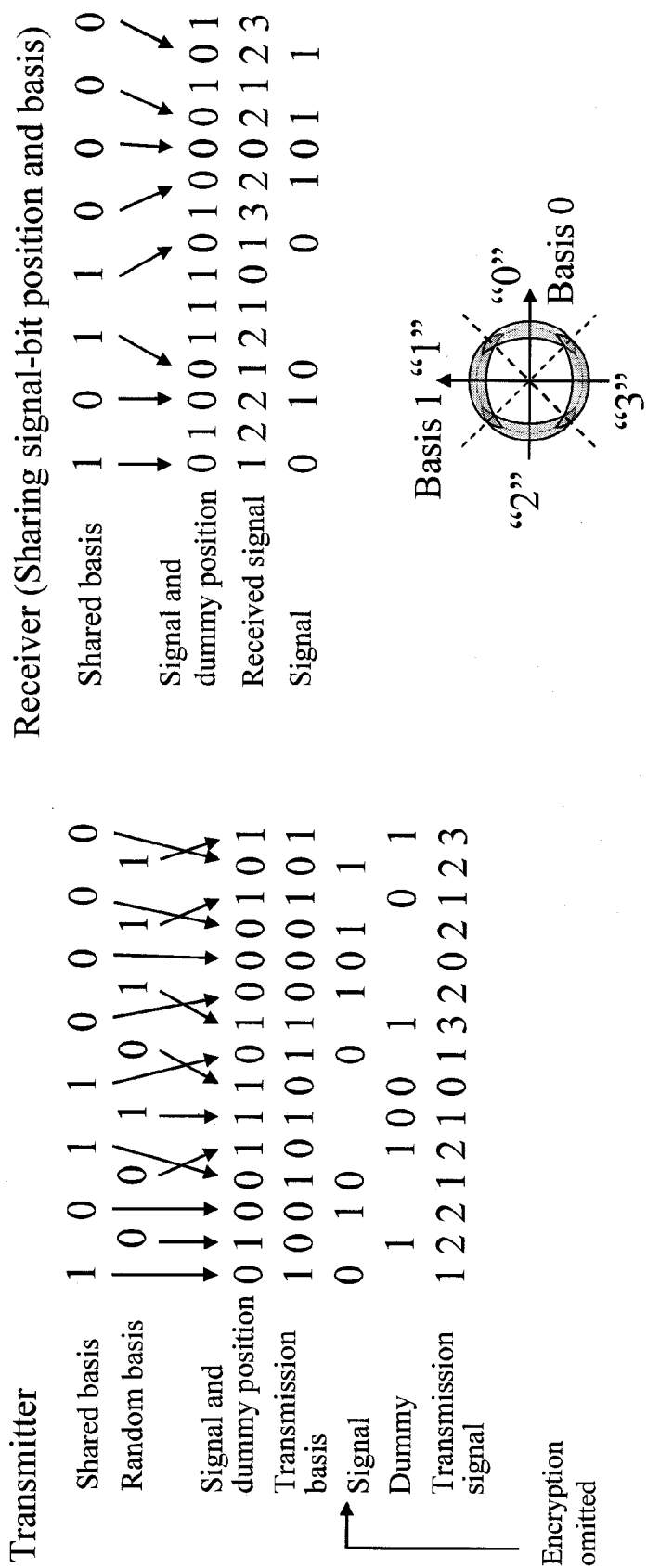
FIG. 10 is a diagram showing signal examples in a case where the present invention is implemented on the basis of the block diagram in FIG. 9.

FIG. 10 shows a specific example of the processing of the bases and random number signals. The shared bases determined by the pseudo-random number generator 123 are 10110000 and the random bases determined by the random number generator 3 (114) are 0010111. The outputs of the pseudo-random number generator 124 that determine the sequences of signal and dummy slots are 010011101000101 (the field "Signal and dummy position" on the left side of FIG. 10). When the bit is "0," the shared basis is set as the transmission basis, and when the bit is "1," the random basis is set as the transmission basis. The results of the transmission bases are 100101011000101. The bases seen by the eavesdropper are the true random numbers (random number generator 3 (114)) and the pseudo-random numbers (pseudo-random number generator 123) which are aligned by use of other pseudo-random numbers (pseudo-random number generator 124). Thus, although the pseudo-random number generators 123 and 124 are used, it is difficult to decrypt signals. Note that, whether to transmit a random number signal or to transmit a dummy random number is determined by the pseudo-random number generator 124, and in order to allow the signal to be transmitted at any timing, the buffers 133 and 134 are provided as in the case of the first and second embodiments. In this embodiment, a random number signal and a shared basis form a pair, and a dummy random number and a dummy basis also form a pair, so that the pairs temporarily wait in the buffers 133 and 134, respectively. As similar to the process in the first and second embodiments, the random number signals (outputs of the random number generator 1 (111)) are encrypted by the seed key 3 (122) and are error-correcting coded in encoder 141. In addition, the transmission signal is quaternary, which is also the same as that in the first embodiment.

In the receiver, two sets of homodyne detectors 312 and 313 are used to detect projections on the q-axis (basis "0") and the p-axis (basis "1"), and the respective projections are subjected to a binary judgment. The binary judged results are processed according to the outputs of the pseudo-random number generator 324 (outputs that are the same as the outputs of the pseudo-random number generator 124). When the output of 324 is "0," the binary judged result is treated as a random number signal. When the output of 324 is "1," the binary judged result is treated as dummy and is discarded. The bases for the random number signals are determined by the outputs of the pseudo-random number generator 323 (same as the outputs of the pseudo-random number generator 123), so that which one of the outputs of the two homodyne detectors is employed is determined accordingly.

The outputs of the pseudo-random number generator 324, which determine the slot positions of the shared bases, synchronize with a transmission clock but since the random number signals are a part of the signals to be transmitted, the outputs of the pseudo-random number generator 323, which determine the shared bases, wait temporarily in the buffer 333 and are matched to the timing at which the random number signals are received. According to the output of the pseudo-random number generator 323 (shared bases), only one of the outputs of the two optical detectors 312 and 313 is adopted as a random number signal, and the output values (shared random numbers) are inputted to the buffer 334 and inputted to the decoder 341 for decoding the error-correcting code while the output timing of the output values are adjusted. Thereafter, the encrypted random number signals are decrypted by the seed key 3 (322) (which is the same as the seed key 3 (122)), and the outputs of the random number generator 1 (111) in the transmitter are reproduced. As described above, the random number signals are shared between the sender and the receiver; the processes by the privacy amplification (171 and 371) are performed in both of the transmitter and the receiver, respectively; and the secret key is shared. The cryptographic communications of the actual signals by use of the secret key are performed in the same manner as the first and second embodiments.

In this method, since the signal and dummy positions and the adopted bases are determined in advance, the security in view of the information theory cannot be ensured unlike in the case of the true random basis scheme of the first and second embodiments. However, it is still difficult for the eavesdropper to perform decryption, and a system in which decryption by the eavesdropper is difficult and which can be operated relatively easily can be built.

FOURTH EMBODIMENT

Figure 11:
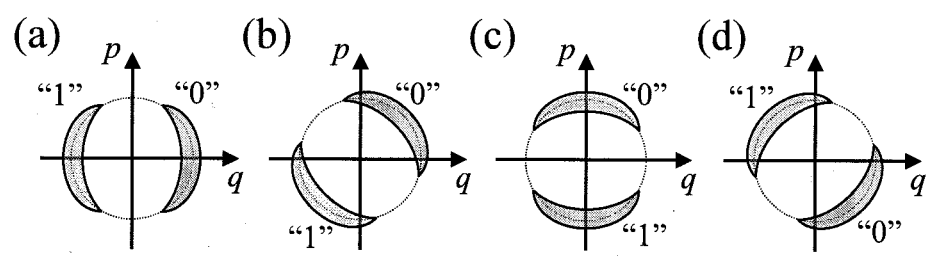
FIG. 11 is a diagram schematically showing signal states in phase space in the case of a binary signal with quaternary basis.
Figure 12:
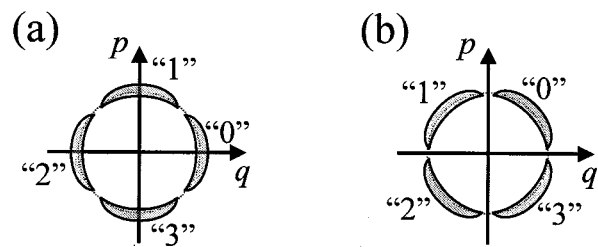
FIG. 12 is a diagram schematically showing signal states in phase space in the case of quaternary signal with binary basis.

The phase modulation scheme of a binary signal with binary basis is shown in the first-to-third embodiments. The scheme of these embodiments is operable with n-ary signal with m-ary basis where n and m are each a positive integer. FIG. 11 is a diagram showing signal states in phase space in the case of a phase modulation scheme of a binary signal with quaternary basis, for example. FIG. 11 (a) shows a binary signal on the q-axis basis, and FIG. 11 (b) shows a binary signal on a basis rotated by 45° from the q-axis. Moreover, FIG. 11 (c) shows a binary signal on the p-axis basis, and FIG. 11 (d) shows a binary signal on a basis rotated by −45° from the q-axis. FIG. 12 is a diagram showing signal states in phase space in the case of a phase modulation scheme of a quaternary signal with binary basis. FIG. 12 (a) shows a quaternary signal using the q-axis and the p-axis as a basis, and FIG. 12 (b) shows a quaternary signal on a basis rotated by 45° from the basis shown in FIG. 12 (a).

Figure 13:
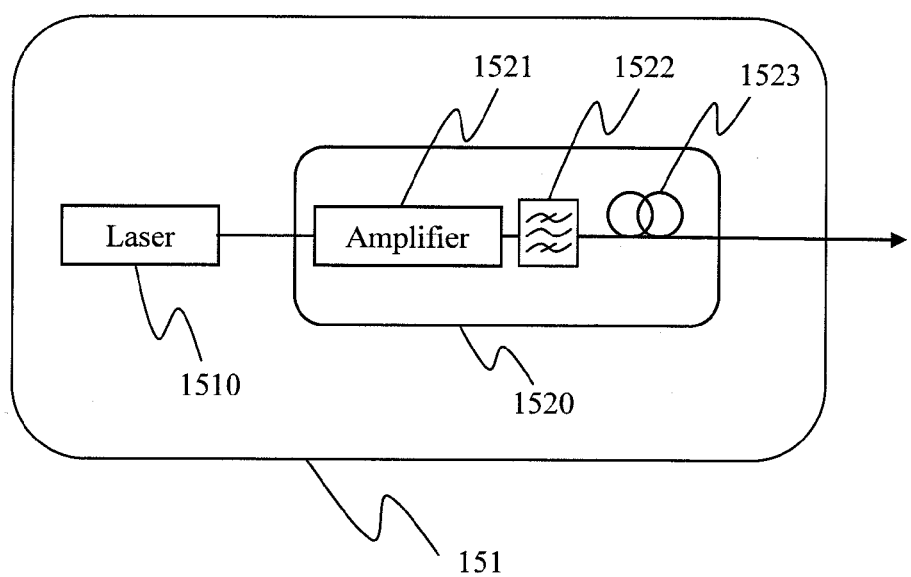
FIG. 13 is a block diagram showing a configuration example for fluctuation light generation.

Here, a description will be given of the fluctuated light source 151, which is a common element between the embodiments. While various forms of the fluctuated light source 151 may be considered, a method using a Kerr effect of an optical fiber is convenient. An example is shown in FIG. 13. The output light from a laser light source 1510 is amplified by an optical amplifier 1521, then passes through a band-pass filter 1522 and propagates through an optical fiber 1523. Phase fluctuations are added via a Kerr effect in the optical fiber. The laser output light is relatively well described using a coherent state, and the shape of the fluctuations in phase space is circular but becomes elliptic via the Kerr effect in the optical fiber and further varies to a crescent shape. When fluctuations in phase space are distributed with an elliptic or crescent shape, the light is called antisqueezed light (T. Tomaru, and M. Ban, "Secure optical communication using antisqueezing," Phys. Rev. A 74, 032312 (2006), T. Tomaru, "LD light antisqueezing through fiber propagation in reflection-type interferometer," Opt. Exp. 15, 11241 (2007). The Kerr effect increases in proportion to the optical intensity, so that it is effective to use pulsed light because the peak intensity is high. In this case, it is important to suppress the pulse spreading associated with fiber propagation. In addition, the pulse width, the optical intensity and the dispersion of the fiber are preferably selected in such a way that the soliton condition is satisfied (JP 2008-003339 A). In addition, when the optical intensity is further increased more than the aforementioned soliton condition, the high-order soliton condition can be met (JP 2008-003339 A). Thus, the pulse-shortening effect is brought about, and the Kerr effect can be reinforced. At this time, the spectrum is spread. This spectrum spreading shows an effect equal to the phase fluctuation in the phase detection, so that the fluctuation effect can be further reinforced. Moreover, similar to the Kerr effect, a Raman effect is also effective in expansion of the phase fluctuation.

Figure 14:
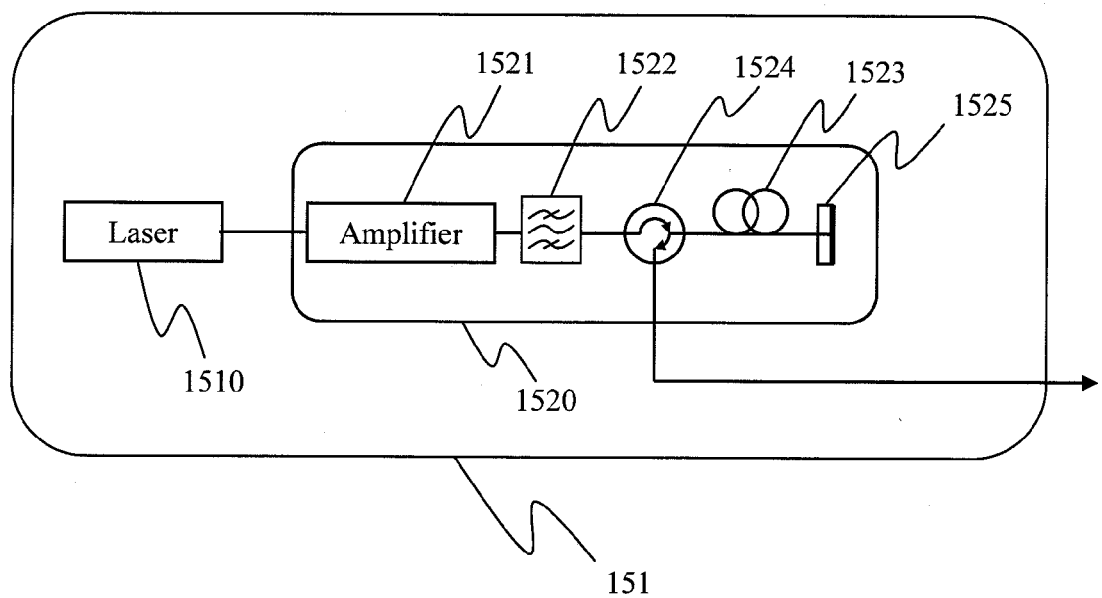
FIG. 14 is a block diagram showing a configuration example for fluctuation light generation.

FIG. 14 shows an embodiment in which an optical circulator 1524 and a Faraday mirror 1525 are used to form the portion of the fiber propagation in the back and forth direction. The embodiment is advantageous in that it is possible to reduce the fiber length by half. In addition, the polarization of the propagating light is rotated by just 90 degrees for back and forth directions in the fiber 1523, regardless of the polarization state in the fiber. Thus, the embodiment is effective when it is desirable to stabilize the polarization at the time of an output of the fluctuation generator. Moreover, it is effective to install an interferometer in a fluctuation generator 1520, which makes the ratio of the phase fluctuation to the amplitude large and increases the effect of phase fluctuations (T. Tomaru, "LD light antisqueezing through fiber propagation in reflection-type interferometer," Opt. Exp. 15, 11241 (2007)).

The embodiment described above is configured to generate a phase fluctuation by the Kerr effect of the optical fiber. It is also possible to output phase-fluctuated light directly from a laser diode (LD). If an LD is operated near a threshold, the phase fluctuation is large. Use of this characteristic is also another method.

Figure 15:
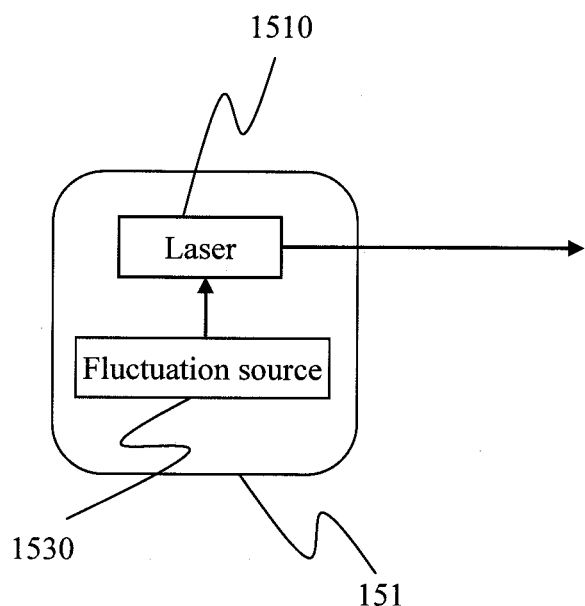
FIG. 15 is a block diagram showing an example of a configuration for superimposing fluctuations on laser and thereby equivalently implementing a fluctuated light source.

An injection current is required for the LD operation. It is also possible to generate the fluctuations of the light source by adding fluctuations (noise) in the injection current. FIG. 15 shows this case. As a fluctuation source, the use of a thermal fluctuation is considered, for example. In addition, since fluctuations can be considered as analog random numbers, it is possible to convert an output of a random number generator into a multiple-value to make the output equivalent to the fluctuations.

Figure 16:
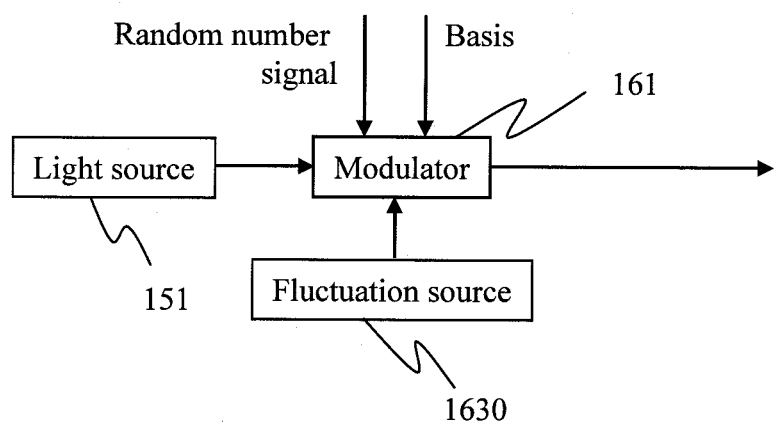
FIG. 16 is a block diagram showing an example of a configuration for superimposing fluctuations in a modulator and thereby equivalently implementing a fluctuated light source.

Adding fluctuations can be also performed in the modulator 161, which gives an effect equivalent to the case where fluctuations exist in the light source (refer to FIG. 16). The modulator 161 is installed for superimposing signals, but it can be used simultaneously for adding fluctuations. As for a fluctuation source 1630, the use of thermal fluctuations or conversion of an output of a random number generator into a multiple-value or the like is considered.

FIFTH EMBODIMENT

Figure 17:
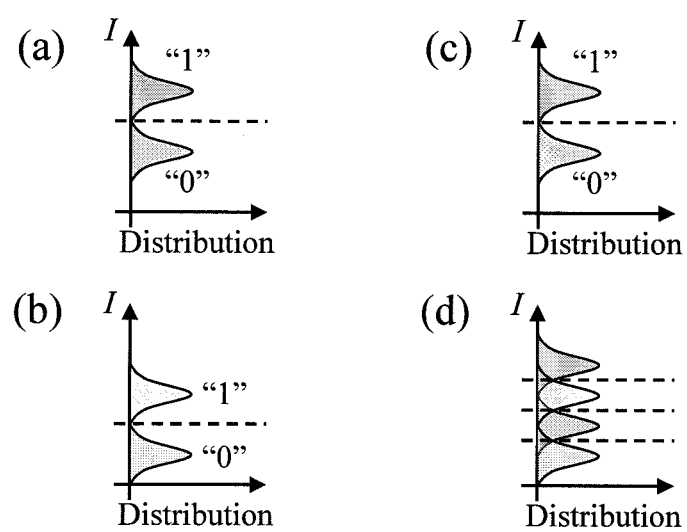
FIG. 17 is a diagram showing intensity distributions of the respective signals in the case of an intensity modulation scheme.

The phase modulation scheme has been described so far as an example. However, the present invention can be applied to an intensity modulation scheme as well. FIG. 17 show aspects of an intensity distribution function of a case where an operation is performed on a binary signal with binary basis. In the intensity modulation scheme, the signal intensities of "0" and "1" depend on the basis. FIGS. 17 (a) and (b) show binary signals, where the bases are different from each other. The thresholds between "0" and "1" are different in FIG. 17 (a) and FIG. 17 (b) due to the difference between the bases. When the basis is unknown, the signal state becomes quaternary in total as shown in FIG. 17 (d) and a quaternary judgment needs to be made. Since the probability distribution has overlapping portions, there are many bit errors. The legitimate receiver who knows the basis may make a quaternary judgment once during the judgment process in some cases as in the case of the first and second embodiments. However, the legitimate receiver can make a binary judgment in principle, where there is almost no overlapping between the probability distributions of binary signals as shown in FIG. 17 (c).

A binary judgment and a quaternary judgment are made in the intensity modulation scheme in the same manner as the phase modulation scheme. Accordingly, the signal processing for the phase modulation scheme shown in the first to third embodiments can be performed in the same manner in the case of the intensity modulation scheme.

The embodiments of the present invention have been described so far with the phase modulation scheme as a primary example. However, as mentioned in the fifth embodiment, the present invention can be implemented in the phase modulation scheme and the intensity modulation scheme without any distinction. In addition, the embodiments have been described using the binary signal with binary basis as a primary example, but the present invention can further be applied to the case of multiple-value with multiple bases as described with reference to FIG. 11 and FIG. 12.

In the present invention, an error-correcting code is used for correcting a bit error slightly remaining for the legitimate receiver and also for correcting basis judgment errors in the receiver. The redundant random number data because of the error-correcting code is transmitted via the optical transmission channel 201 in FIG. 3 and FIG. 7. It is ideal that the random number signal be transmitted with a random basis via the optical transmission channel 201, originally. In this respect, let us consider that the redundant portion of the error-correcting code is transmitted via the optical transmission channel 202. Accordingly, only a complete random number signal is transmitted via the optical transmission channel 201. Since the optical transmission channel 202 is a normal transmission channel, there is no security for the redundant portion. However, the information amount of the redundant portion is subtracted from the secret capacity during the process of generating a secret key. Thus, there is no problem. In addition, when the redundancy portion is surely transmitted via the optical transmission channel 202, the complexity in the processing in the receiver is eased. In the first and second embodiments, the parity check function existing in the error-correcting code is used for making a basis-judgment, then a basis checking error is corrected according to the result of the parity check, and thus, a random number signal and a dummy random number are identified. In the first and second embodiments, a redundancy portion and a random number data portion of a signal are transmitted together as a series of data. Thus, which portion is the redundancy portion or the random number data portion is not determined during the initial processing stage of the receiver, and the redundancy portion is determined while a basis-judgment error is corrected. For this reason, the data processing has to be complicated. However, if the redundancy portion is transmitted via the optical transmission channel 202, the data of the redundancy portion for the parity check becomes clear and surely delivered to the receiver. Thus, the complexity of the process of determining a basis in the receiver is eased, and the computation time, the amount of heat generation and the like in circuit implementation are eased. An embodiment based on this idea will be described below.

SIXTH EMBODIMENT

Figure 18:
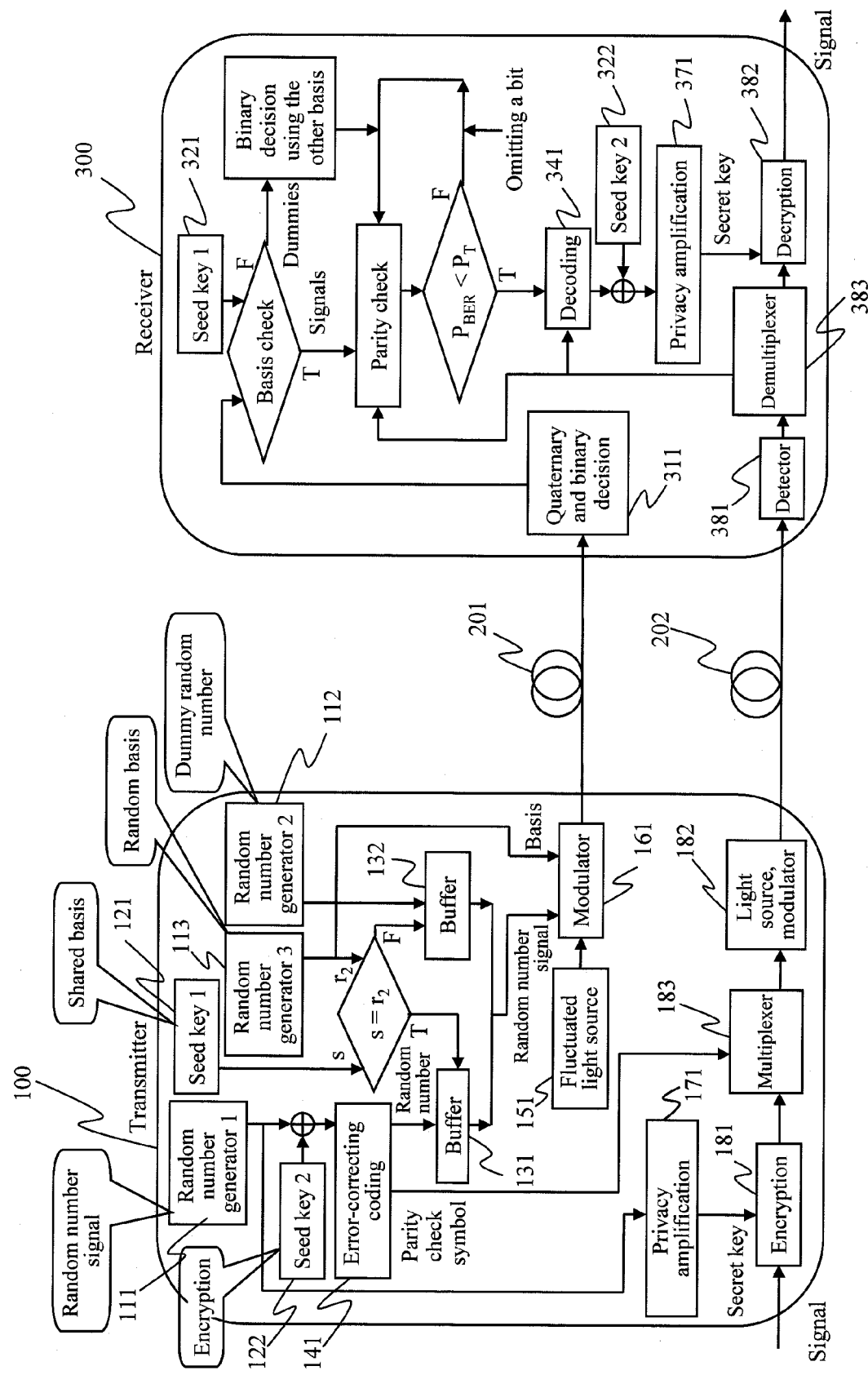
FIG. 18 is a block diagram showing a configuration example of a cryptographic communication system according to the present invention.

If both of the bases and signals are converted into true random numbers, the eavesdropper only sees a completely random signal sequence. FIG. 18 shows a configuration example of a cryptographic communication system according to the present invention. The three random number generators (111, 112 and 113) and the seed keys (121 and 122) of two types, each of which is made of random numbers, are arranged in the transmitter 100. It is also possible to use only a single random number generator by dividing the output of the random number generator into three parts, and to use a seed key of a single type by dividing the output of the seed key into two parts. The outputs of the random number generator 1 (111) are the random numbers that become a signal for generating a secret key. The random numbers are then encrypted by use of the seed key 2 (122), and then are error-correcting coded in encoder 141. In encoder 141, the information symbol part and the parity check symbol part are separated. Here, the former is called a random number code and the latter is called a check symbol. The random number code is prepared in the buffer 131 for transmission. In the buffer 132, the outputs of the random number generator 2 (112) are prepared as random numbers for a dummy signal. The random number generator 3 (113) determines the transmission bases, and a signal is transmitted via the layer 1 according to this random bases. In order for the legitimate receiver to correctly receive the signal, the shared bases need to be used. For this reason, the seed key 1 (121) is used. The bases are made completely random by the random number generator 3 (113), but instead of adopting all the transmitted and received random numbers as the signal, only a random number of a case where a random basis coincides with the basis determined by the seed key 1 (121) is adopted. Thus, the sequence of bases is formed in such a way that it seems random for the eavesdropper, but seems having a pattern for the legitimate receiver.

Figure 19:
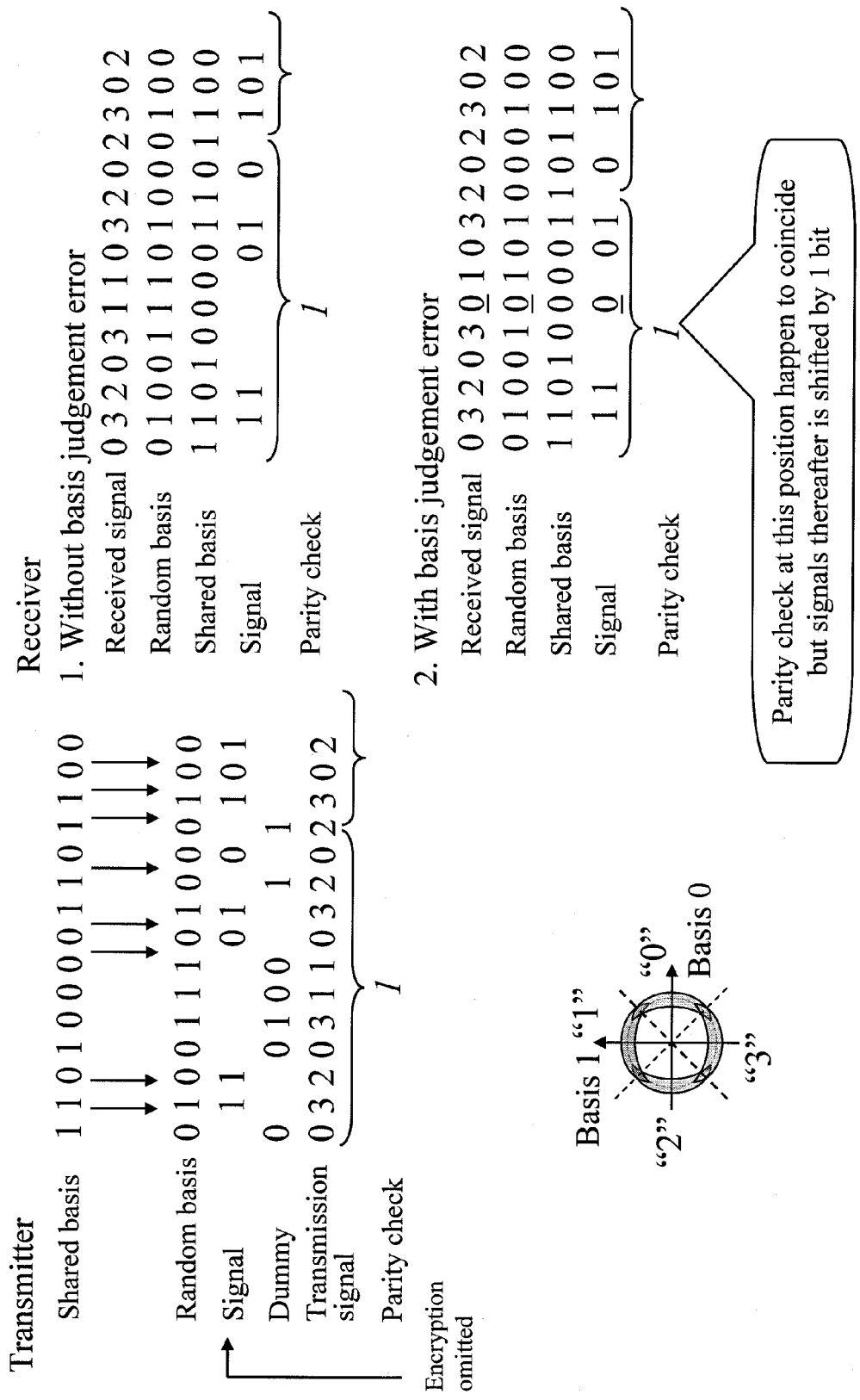
FIG. 19 is a diagram showing signal examples in a case where the present invention is implemented on the basis of the block diagram in FIG. 18.

FIG. 19 shows a specific example of the random number signal and the dummy random numbers to be processed in the aforementioned scheme. In order to specify the basis, the q-axis basis of FIG. 1 is set to "0" while the p-axis basis thereof is set to "1." The random bases determined by the outputs of the random number generator 3 (113) are set to 010011101000100. Meanwhile, the bases shared in advance between the sender and the receiver are set to 110100001101100. In FIG. 19, the first basis of the shared bases is "1" but the first basis of the random bases determined by the random number generator 3 is "0," and thus the initial bases do not coincide with each other. In this case, a dummy random number (waiting in the buffer 132) is superimposed on the basis "0" and is transmitted. The random numbers are superimposed on the output light from the fluctuated light source 151 through the modulator 161. The second output of the random bases (random number generator 3 (113)) is "1" and coincides with the second output of the shared bases in this case. Thus, the random number code (waiting in the buffer 131) is superimposed on the basis and is transmitted. The next shared basis and random basis are both "0," so that the random number code is subsequently superimposed on the basis and is transmitted. The same processing is repeated below.

In this scheme, which of the random number code and the dummy random number are superimposed is determined depending on the output of the random bases (random number generator 3 (113)). Thus, the buffer 131 and the buffer 132 are provided to adjust timing, and the random number codes and the dummy random numbers wait therein as shown in FIG. 18. The signal (random number code and dummy random number) is binary and the basis is also binary, so that the signal to be transmitted is a quaternary. Allocation of the quaternary signals in phase space is shown in a lower left portion of FIG. 19. In the field "transmission signal" in FIG. 19, the quaternary signal values are shown. The random numbers in the field "signal" are the random codes, and the random numbers in the field "dummy" are the dummy random numbers. The filed, "parity check" shows the parity check symbol. Here, the parity for every five bits of the random number code is treated as a check symbol, for example.

The parity check symbol generated in encoder 141 is multiplexed in the multiplexer 183 with another signal that is transmitted in a normal transmission channel, which makes the parity check symbol to be transmitted via the normal optical transmission channel 202. This multiplexing is a method used in normal communications, such as packetization or time division multiplexing. Thereafter, the signal is led to the optical transmitter 182 and then transmitted to the receiver 300 via the optical transmission channel 202. Then, the signal is received by the optical detector 381, then converted into an electric signal and then transmitted to a demultiplexer 383. The demultiplexer 383 is configured to separate the multiplexed signal sequences into the state before the multiplexing. The parity check symbol is isolated from the other signal herein.

The signal (random number code and dummy random number) is transmitted through the optical transmission channel 201 and received by the detector 311 in the receiver 300. In the detector 311, a quaternary judgment and a binary judgment are made simultaneously. This processing is easy. Two sets of homodyne detectors are used to measure two orthogonal phase components (q-axis component and p-axis component). Output values $I_q$ and $I_p$ of each of the homodyne detectors that are subjected to binary judgments (whether each component is positive or negative) correspond to the results of the binary judgments for the respective bases. Quaternary judgments ("0," "1," "2," "3": refer to FIG. 19) can be made if phases q are determined by arctan ($I_p/I_q$) from the output values $I_q$ and $I_p$ of the detection results of the two sets of the homodyne detectors. Since the bases are randomized, the signal state seems to be a random quaternary signal also to the legitimate receiver. In this respect, a quaternary judgment is first made to determine which basis is used. The random basis is judged in such a way that the basis is "0" when the result of the quaternary judgment is "0" or "2," and the basis is "1" when the result of the quaternary judgment is "1" or "3." The determined basis is checked with the shared basis determined by the seed key 1 (321) (the same seed key as the seed key 1 (121) in the transmitter). If the basis coincides with the shared basis, the superimposed signal is judged as a random number code and if the basis does not coincide with the shared basis, the superimposed signal is judged as a dummy random number. An example of the above described processing in the receiver is shown on the right side of FIG. 19. Because the bases are quaternary judged, there are many basis judgment errors, i.e., there are many judgment errors in checking the random bases with the shared bases.

In order to correct these errors, the parity check symbol transmitted via the optical transmission channel 202 is used. If there is no error in the checking of the random bases with the shared bases, the BER of the random number data becomes a previously estimated small value. However, if there is an error in the checking, the bit at which the error has occurred and the bits thereafter result in a bit error with a probability of ½. Accordingly, the position where the bit error has started can be approximately identified by the parity check. The position where the bit error has started is the position where a dummy random number is inserted or a random number code is dropped. Therefore the bit at the position where the bit error has started is omitted, or the bit that has been originally judged as a dummy and thus discarded is returned, and parity is again checked. This process is repeated sequentially for all suspected bits, and thereby, a bit sequence having almost no bit error is found.

A specific example of a case where there is a bit error is shown in FIG. 19. For the sake of simplicity, let us consider a case where a simple parity check bit is generated in encoder 141. Let us suppose that the random number data is divided into five bits each, and a check symbol is "1" if the number of bits "1" is odd and "0" if the number of bits "1" is even. The random number code is shown in the field "Signal" on the transmitter in FIG. 19, and is 11010101. The parity for the first five bits from left results in 1 and is shown in the field, "Parity Check." If there is no bit error in the receiver, the parity calculated for the received random number code coincides with the value of the check symbol. Let us suppose that a random basis judgment error occurs in the receiver at the sixth bit from left in FIG. 19. In the example of the receiver in FIG. 19, the underlined bits correspond to a judgment error. In this case, the bit that is not actually a signal bit is treated as a signal bit, so that the random numbers corresponding to signals are increased by one bit.

When the receiver performs parity check without knowing that one bit has been shifted, the parity does not match by a probability of ½ at the bit where the bit error occurs and the bits following the bit. Thus, the position where the bit error has occurred can be substantially determined. Change of basis judgment is repeated for every bit that is supposed to be an error to find a bit sequence with which the parity becomes substantially normal. In the example of the receiver in FIG. 19, the bits each indicated by an underline are the errors, and deletion of this bit from shared random numbers allow the bit sequence to return to the error-free state. In a case where a bit that has been judged as a dummy and thus discarded is returned, the basis judgment is corrected through this return process because the original basis judgment is wrong. The signal judgment in this case is binary because the basis is definite. In this scheme, the receiver first makes a quaternary judgment but the processing reduces it to a binary judgment during the process of correcting the basis judgment error. In the case of a binary judgment, the BER becomes small as compared with the case of a quaternary judgment. This difference is the factor that the legitimate receiver has an advantage over the eavesdropper in view of the information theory, and such an advantage is given by the seed key 1 (121 and 321) shared between the sender and the receiver in advance.

When the bit errors are almost removed, and the BER is reduced to a value with which error correction is possible, the error-correcting code is decoded (341), and decryption by the seed key 2 (322) is performed. Thus, the outputs of the random number generator 1 (111) in the transmitter are reproduced in the receiver. In order to generate the final secret key, the information amount determined by the difference between the BERs for a binary judgment (legitimate receiver) and for a quaternary judgment (eavesdropper) is corrected by the redundant amount in the error-correcting code. The amount of the random numbers shared between the sender and the receiver is reduced according to the corrected secret capacity through the privacy amplification (171 and 371).

The privacy amplification can be achieved through a logical operation, for example. Let us suppose that 20% of the random numbers shared between the sender and the receiver is the secret capacity and that the shared random numbers are "01001 01110." When every five bits are exclusively ORed, the result is "01." In this processing, all the data is equally treated, and the information amount is reduced to 20%. This is an example of the privacy amplification.

The BERs of the legitimate receiver and the eavesdropper can be estimated as in the manner similar to that in the first embodiment. If the fluctuation of a Gaussian distribution is set in such a way that the BER of the legitimate receiver should become $10^{-12}$, the BER of the eavesdropper becomes approximately $10^{-4}$ as shown in FIG. 6.

The error-correcting coding (141) performed on a random number signal (111) does not have to be capable of correcting an error of a case where a quaternary judgment (a binary judgment in the condition of two bases) is made. In the process of checking the bases in the receiver, it is sufficient to find the position where bit errors successively occur. If the bit at the starting point of the successive bit errors can be identified, the BER is reduced by correcting the bit to a value with which binary judged results (binary judgment in the condition of a single basis) can be error-corrected. On the other hand, if error correction is possible for quaternary judged results (a binary judgment in the condition of two bases), the difference in BER between the legitimate receiver and the eavesdropper cannot be used. To put it more specifically, the difference between the legitimate receiver and the eavesdropper, which is ensured in accordance with the information theory, no longer exists. Accordingly, in order to form the difference between the legitimate receiver and the eavesdropper in accordance with the information theory in the protocol, the capability of the error-correcting code performed on the random number signal needs to be sufficient for the legitimate receiver who makes a binary judgment in the condition of a single basis (BER is equal to $10^{-12}$, for example), and needs to be insufficient for the eavesdropper who needs to make a binary judgment in the condition of two bases (BER is equal to $10^{-4}$, for example). Furthermore, it is desirable that the error-correcting code should be designed so as to be capable of determining as easily as possible the starting point of the successive bit errors that have occurred during the process of checking the bases.

The signals transmitted and received via the optical transmission channel 201 are random numbers, and the bases are also determined by true random numbers. The seed key 2 (122) is used for encrypting the random number signals, but the eavesdropper cannot guess the seed key 2 (122) because the signals are the random numbers. The seed key 1 (121) for determining the shared bases are also buried in the random bases, so that the eavesdropper cannot guess the seed key 1 (121) either. The eavesdropper cannot obtain meaningful information via the optical transmission channel 201. Thus, the difference in BER between the legitimate receiver and the eavesdropper gives the secret capacity. However, correction needs to be made by the redundant portion of the error-correcting code. If the privacy amplification 171 in the transmitter 100 and the privacy amplification 371 in the receiver 300 perform an arithmetic operation by use of the same algorithm, a common secret key is formed between the transmitter and the receiver.

The actual signal is encrypted with encrypter 181 using the secret key generated in the transmitter, then multiplexed with another signal by the multiplexer 183, then superimposed on carrier light in the optical transmitter 182 and then transmitted to the receiver 300 via the optical transmission channel 202. The optical transmitter 182 is configured of a light source and a modulator configured to modulate the output light of the light source.

The receiver 300 receives the transmitted signal light via an optical detector 381 and transforms it to an electric signal. The demultiplexer 383 divides the electric signal into the signal state before being multiplexed, and the encrypted signal is separated and is then decrypted by use of the secret key in decrypter 382. In the manner described above, the series of processes for performing secure cryptographic communications ends.

The carrier light in the optical transmission channel 202 does not need to have fluctuations. Normal optical communications may be used, instead. The optical transmission channels 201 and 202 may be physically different, or wavelength-division multiplexing may be performed by use of the same optical transmission channel.

SEVENTH EMBODIMENT

Figure 20:
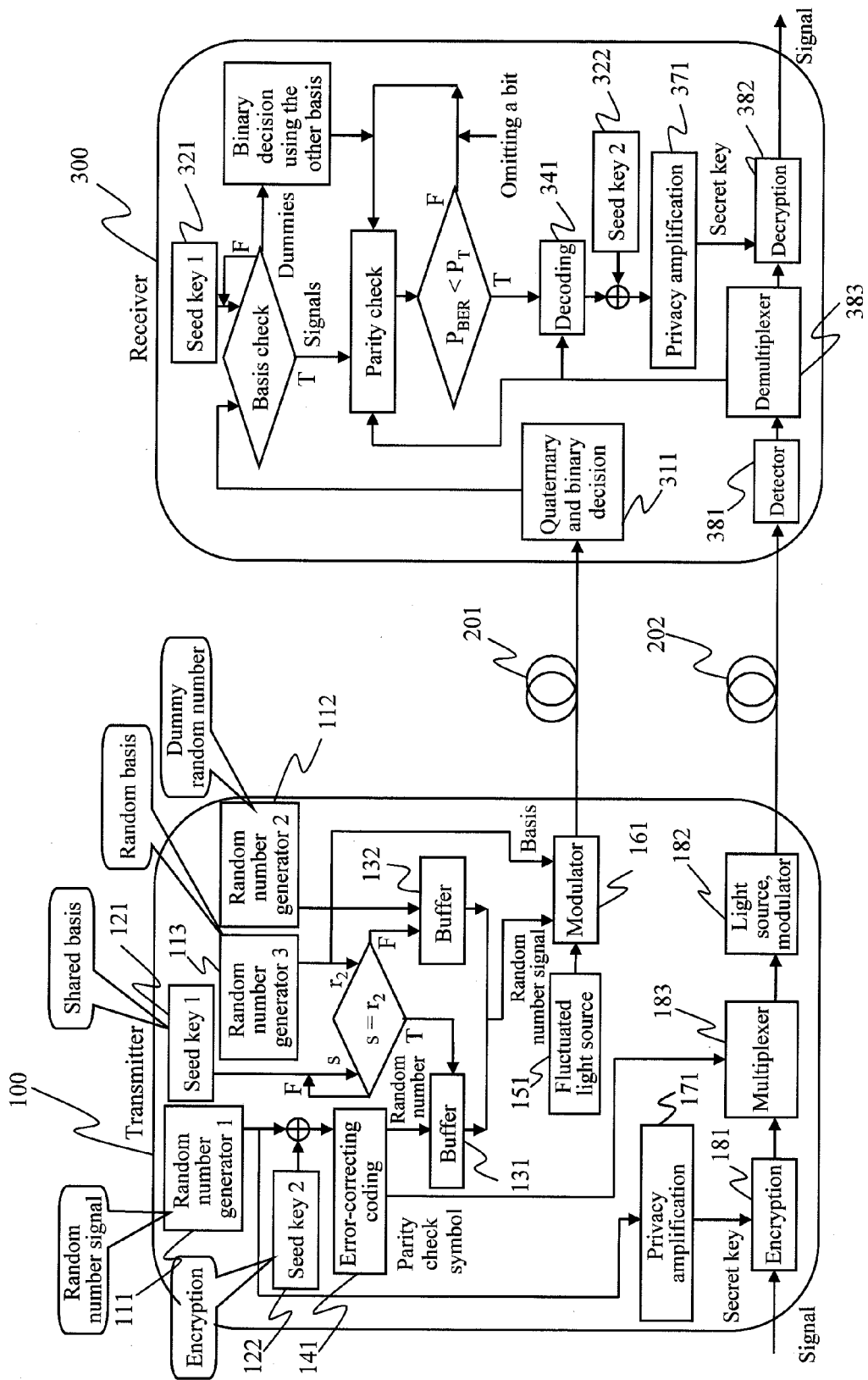
FIG. 20 is a block diagram showing a configuration example of a cryptographic communication system according to the present invention.

In the sixth embodiment, the random basis and the shared basis are compared with each other, bit by bit, and whether to transmit a random number code or a dummy random number is determined. The method for comparing shared bases with random bases does not have to be the one described in the sixth embodiment, and a method other than the one described in the sixth embodiment may be used. FIG. 20 shows a configuration example of a cryptographic communication system for achieving the method. In this embodiment, similar to the sixth embodiment, whether to transmit a random number code or a dummy random number is determined by checking a random basis with a shared basis. However, when a shared basis and a random basis do not coincide with each other, the method in this embodiment is different from that in the sixth embodiment. In this case, a dummy random number is transmitted as similar to the process in the sixed embodiment, but the dissident shared basis is again checked with the next random basis, and the result determines whether to transmit a random number code or a dummy random number in the next bit. The shared basis is checked with the random bases until the shared basis and the random basis coincide with each other. To put it differently, an operation is performed in such a way that the sequence of the bases on which a random number code is superimposed coincides with the sequence of the shared bases.

Figure 21:
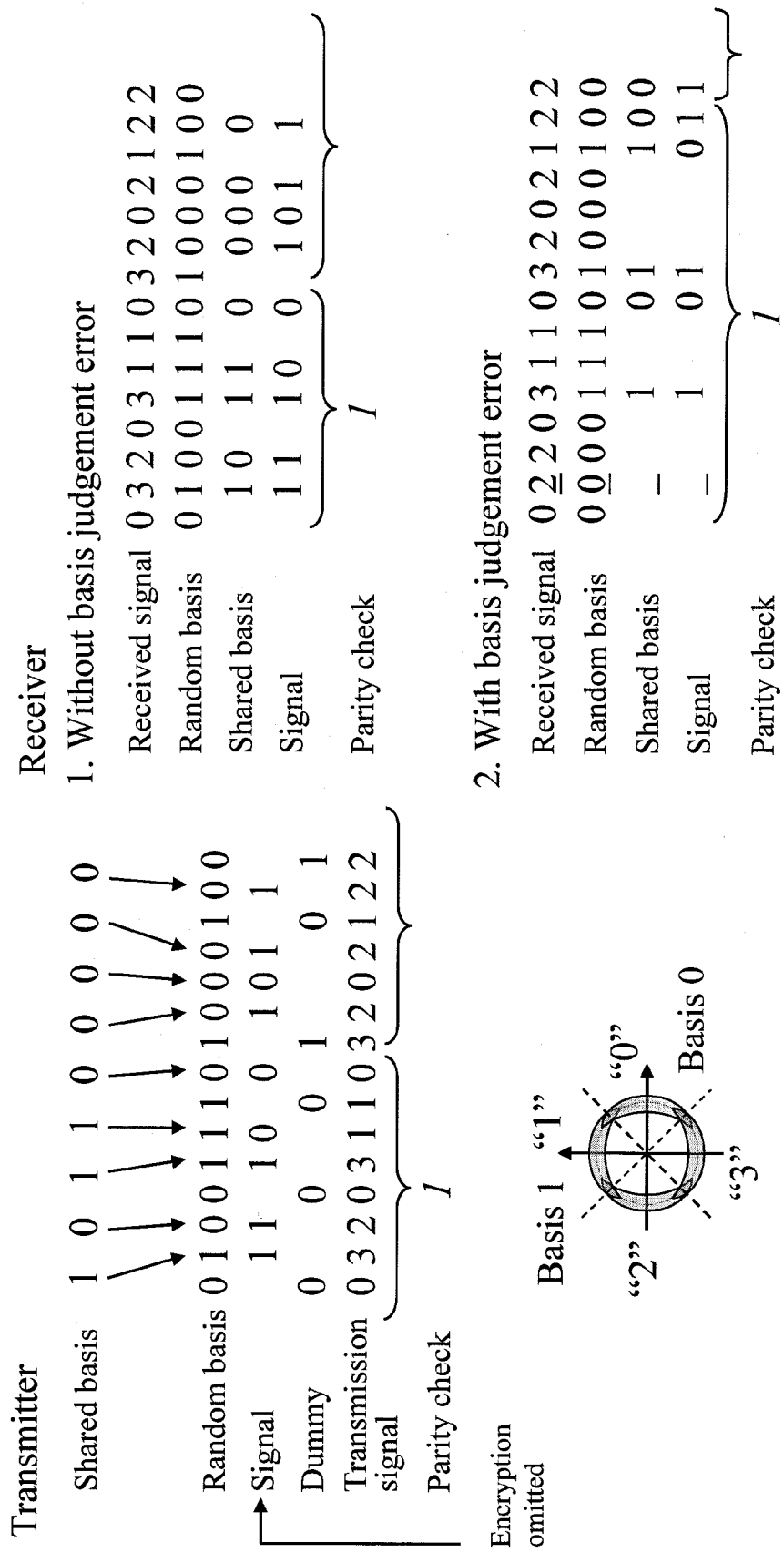
FIG. 21 is a diagram showing signal examples in a case where the present invention is implemented on the basis of the block diagram in FIG. 20.

FIG. 21 shows a specific example of the aforementioned scheme. The random bases determined by the outputs of the random number generator 3 (113) are 010011101000100 in FIG. 21. Meanwhile, the bases shared in advance between the sender and the receiver by the seed key 1 (121, 321) made of random numbers are 101100000. In the transmitter, transmission of the random number signal with the sequence of the bases determined by the shared bases is prepared first. In the example in FIG. 21, the first basis of the shared bases is "1" but the first basis of the random bases determined by the random number generator 3 (113) is "0" and does not coincide with "1." Thus, the dummy random number (an output of the random number generator 2 (112)) is superimposed on the basis "0" in this case and is transmitted. The shared basis "1," which does not coincide with "0," is again checked with the next random basis. The second output of the random bases (the random number generator 3 (113)) is "1" and coincides with the first basis of the shared random bases, "1." Thus, the random number code is superimposed on the basis and is transmitted. The random number signal is error-correcting coded as in the case of the sixth embodiment, and a random number code corresponding to an information symbol and a parity check symbol of a redundancy portion are separated in encoder 141. For the sake of simplicity, the parity for every five bits is set to the check symbol as in the case of the sixth embodiment.

The processing in the receiver 300 is modified from the processing in the sixth embodiment, as similar to the modification in the processing in the transmitter 100. Firstly, which one of the two bases is used is judged through a quaternary judgment. This is the same as the scheme according to the sixth embodiment. The basis is then checked with the shared basis, and if the basis coincides with the shared basis, the random number datum is adopted as the random number code. If the basis does not coincide with the shared basis, it is determined to be the dummy random number. The shared basis that does not coincide with the random basis is again checked with a random basis determined from the next received signal. If the shared basis coincides with the random basis, the basis and the random number datum are adopted. In a case where there is a basis judgment error, the parity at the position and thereafter results in an error with a probability of ½. Accordingly, the position where the judgment error has occurred can be substantially identified. The position where the judgment error has occurred is the position where a dummy random number is inserted or a random number code is dropped. Thus, the following parity checks are performed sequentially: (1) A bit near the position where the judgment error has occurred is omitted; the basis is again checked at the position and thereafter; and parity is checked. (2) The bit that has been judged as a dummy and thus discarded near the position where the judgment error has occurred is returned; the basis is again checked at the position and thereafter; and parity is checked. These processes are repeated for all suspected bits, and a bit sequence having almost no bit error is found. Examples of the cases where there is a basis-judgment error and where there is no basis judgment error are shown on the right side of FIG. 21. In the example, the basis checking of the second bit from left results in a judgment error (indicated by an underline in the receiver), and the random number signal that is to become the shared random number actually is judged as a dummy random number by an error. For this reason, the number of signal bits is decreased, and the shared random numbers become quite different. The example in FIG. 21 shows how the slot positions of the shared random numbers are changed completely from the original form when there is a basis judgment error. In this case, the parity at the position and thereafter results in an error with a probability of ½, and the position where the bit error has occurred is substantially found. If the position of the bit error can be approximately identified, the bits around the position are checked bit-by-bit and are corrected. The correction is repeated until all bit errors are substantially corrected, and the BER with which decoding the error-correcting code is possible is formed.

In the scheme according to the seventh embodiment, if insertion or removal of a signal bit is performed according to a basis judgment error in the receiver, the basis checking after this position needs to be performed again. Thus, the scheme according to the seventh embodiment has a disadvantage that the amount of processing is larger than that of the scheme according to the sixth embodiment, but has an advantage that the sequence of the shared bases is determined completely by the seed key alone.

INDUSTRIAL APPLICABILITY

The present invention shows that a secure secret key can be generated by use of fluctuations with a seed key as the source. In the present invention, the seed key is used as the source, but the security of the process of generating the secret key is ensured in accordance with the information theory. Accordingly, even if the eavesdropper attempts to decrypt the ciphertext, there is no effective attack except for the exhaustive key search for the seed key. To put it differently, the thread that an efficient decryption technique for the ciphertext may be found no longer exists. With the scheme according to the present invention, the current optical communication network can be used without any change, and the scheme is thus realistic and is a scheme with high applicability. Based on these two reasons, the industrial applicability of the present invention is high.

The invention claimed is:

1. A cryptographic communication system comprising:
a transmitter including a first random number generator, an encoder for error-correcting coding, a second random number generator, a third random number generator, a first light source, a first modulator, equipment for privacy amplification, an encrypter and an optical transmitter having a second light source and a second modulator;
a receiver including a first optical detector, a decoder for decoding an error-correcting code, equipment for privacy amplification, a second optical detector and a decrypter; and
an optical transmission channel connecting the transmitter and the receiver to each other, wherein
the transmitter and the receiver share a first seed key made of random numbers in advance,
the first seed key provides a shared basis to the transmitter and the receiver,
in the transmitter,
an output of the first random number generator is set as a random number signal and is error-correcting coded in the encoder,
an output of the second random number generator is set as a dummy random number, an output of the third random number generator determines a random basis for transmission of the random number signal and the dummy random number, the random number signal is used as a signal when the random basis and the shared basis coincide with each other; and the dummy random number is used as the signal when the random basis and the shared basis do not coincide with each other,
the first modulator forms first signal light by superimposing the signal with the random basis on output light from the first light source,
in the formation of the first signal light, the output light from the first light source is accompanied with fluctuations, or fluctuations are superimposed thereon in the first light source or the first modulator,
the first signal light is outputted to the optical transmission channel,
the equipment for privacy amplification generates a secret key by reducing the number of bits of the random number signal which is the output of the first random number generator,
the encrypter encrypts a transmission signal by use of the secret key, and
the optical transmitter outputs second signal light modulated with the encrypted transmission signal, and
in the receiver,
the first optical detector receives the first signal light,
a judgment is made on values of the random basis and the signal value, then the received random basis is checked with the shared basis, and if the random basis coincides with the shared basis, the signal is decoded to a random number signal in the decoder, the equipment for privacy amplification extracts the secret key by reducing the number of bits, the second optical detector receives the second signal light, and the decrypter decrypts the transmission signal from the signal received with the second optical receiver, by use of the extracted secret key.

2. The cryptographic communication system according to claim 1, wherein the fluctuations of the output light from the first light source are phase fluctuations or intensity fluctuations, or phase fluctuations or intensity fluctuations are superimposed in the first signal light with the first light source or the first modulator.

3. The cryptographic communication system according to claim 1, wherein the transmitter and the receiver share a second seed key in advance, in the transmitter, the random number signal generated from the first random number signal generator is encrypted by use of the second seed key, and thereafter is error-correcting coded in the encoder, and in the receiver, the signal is first error-corrected using the decoder and next is decrypted by use of the second seed key.

4. The cryptographic communication system according to claim 1, wherein each of the random number signal and the dummy random number is binary while the random basis is binary, and the signal is transmitted in a quaternary state in combination.

5. The cryptographic communication system according to claim 1, wherein each of the random number signal and the dummy random number is n-ary while the random basis is m-ary, and the signal is transmitted in a n×m-ary state in combination.

6. A cryptographic communication system comprising:

a transmitter including a first random number generator, an encoder for error-correcting coding, a second random number generator, a third random number generator, a first light source, a first modulator, equipment for privacy amplification, an encrypter, and an optical transmitter having a second light source and a second modulator;

a receiver including a first optical detector, a decoder for decoding an error-correcting code, equipment for privacy amplification, a second optical detector and a decrypter; and an optical transmission channel connecting the transmitter and the receiver to each other, wherein the transmitter and the receiver share a first seed key made of random numbers in advance, the first seed key provides a shared basis to the transmitter and the receiver, in the transmitter, an output of the first random number generator is set as a random number signal and is error-correcting coded in the encoder, an output of the second random number generator is set as a dummy random number, and an output of the third random number generator determines a random basis for transmission of the random number signal and the dummy random number, a signal for each random basis is determined by using the random number signal when the random basis and the shared basis coincide with each other, and by using the dummy random number when the random basis and the shared basis do not coincide with each other, when the random basis and the shared basis do not coincide with each other, the shared basis is again used for determining the next signal, the next signal is determined by using the random number signal when the next random basis coincides with the shared basis, and by using the dummy random number when the next random basis does not coincide with the shared basis, the same processing is repeated, and the next shared basis is referred after the shared basis coincides with the random basis, the first modulator forms first signal light by superimposing the signal with the random basis on output light from the first light source, in the formation of the first signal light, the output light from the first light source is accompanied with fluctuations, or fluctuations are superimposed thereon in the first light source or the first modulator, the first signal light is outputted to the optical transmission channel, the equipment for privacy amplification generates a secret key by reducing the number of bits of the random number signal which is the output of the first random number generator, the encrypter encrypts a transmission signal by use of the secret key, and the optical transmitter outputs second signal light modulated with the encrypted transmission signal, and in the receiver, the first optical detector receives the first signal light, a judgment is made on values of the random basis and the signal, then the received random basis is checked with the shared basis, and the process of checking the random basis with the shared basis is repeated using the same shared basis until the random basis and the shared basis coincide with each other, the signal is treated as the random number signal when the shared basis and the random basis coincide with each other, and the same processing is repeated for the next shared basis, the decoder decodes the signals obtained through the above series of process and outputs the random number signals, the equipment for privacy amplification extracts the secret key by reducing the number of bits, the second optical detector receives the second signal light, and the decrypter decrypts the transmission signal from the signal received by the second optical receiver, by use of the extracted secret key.

7. The cryptographic communication system according to claim 6, wherein the fluctuations of the output light from the first light source are phase fluctuations or intensity fluctuations, or phase fluctuations or intensity fluctuations are superimposed in the first signal light with the first light source or the first modulator.

8. The cryptographic communication system according to claim 6, wherein the transmitter and the receiver share a second seed key in advance, in the transmitter, the random number signal generated from the first random number signal generator is encrypted by use of the second seed key, and thereafter is error-correcting coded in the encoder, and in the receiver, the signal is first error-corrected using the decoder and next is decrypted by use of the second seed key.

9. A cryptographic communication system comprising:

a transmitter including a first random number generator, an encoder for error-correcting coding, a second random number generator, a third random number generator, a first pseudo-random number generator, a second pseudo-random number generator, a first light source, a first modulator, equipment for privacy amplification, an encrypter, and an optical transmitter having a second light source and a second modulator;

a receiver including a first optical detector, a first pseudo-random number generator, a second pseudo-random number generator, a decoder for decoding an error-correcting code, equipment for privacy amplification, a second optical detector, and a decrypter; and an optical transmission channel connecting the transmitter and the receiver to each other, wherein the transmitter and the receiver share a first seed key and a second seed key each of which is made of random numbers in advance, the first seed key provides a shared basis via the first pseudo-random number generator in each of the transmitter and the receiver, the second seed key provides a signal slot in which the shared basis is used, via the second pseudo-random number generator in each of the transmitter and the receiver, in the transmitter,
  an output of the first random number generator is set as a random number signal and is error-correcting coded in the encoder,
  an output of the second random number generator is set as a dummy random number, and an output of the third random number generator determines a dummy random basis,
  the random number signal is used as a signal in the signal slot in which the shared basis is used, and the dummy random number is used as the signal in a signal slot in which the shared basis is not used and the dummy random basis is used,
  the first modulator forms first signal light by superimposing the signal on output light from the first light source,
  in the formation of the first signal light, the output light from the light source is accompanied with fluctuations, or fluctuations are superimposed thereon in the light source or the modulator,
  the first signal light is outputted to the optical transmission channel,
  the equipment for privacy amplification generates a secret key by reducing the number of bits of the random number signal which is the output of the first random number generator,
  the encrypter encrypts a transmission signal by use of the secret key, and
  the optical transmitter outputs second signal light modulated with the encrypted transmission signal, and in the receiver,
  the first optical detector receives the first signal light,
  the decoder decodes the signal transmitted in the signal slot of the shared basis as the random number signal,
  the equipment for privacy amplification extracts the secret key by reducing the number of bits,
  the second optical detector receives the second signal light, and
  the decrypter decodes the transmission signal from the signal received with the second optical receiver by use of the extracted secret key.

10. The cryptographic communication system according to claim 9, wherein
  the transmitter and the receiver share a third seed key in advance,
  in the transmitter, the random number signal generated from the first random number signal generator is encrypted by use of the third seed key, and thereafter is error-correcting coded in the encoder, and
  in the receiver, the signal is first error-corrected in the decoder and next is decrypted by use of the third seed key.

11. The cryptographic communication system according to claim 9, wherein the fluctuations of the output light from the first light source are phase fluctuations or intensity fluctuations, or phase fluctuations or intensity fluctuations are superimposed in the first signal light with the first light source or the first modulator.

12. A cryptographic communication system comprising:

a transmitter including a first random number generator, an encoder for error-correcting coding, a second random number generator, a third random number generator, a first light source, a first modulator, equipment for privacy amplification, an encrypter, and an optical transmitter having a second light source and a second modulator;

a receiver including a first optical detector, a decoder for decoding an error-correcting code, equipment for privacy amplification, a second optical detector, and a decrypter; and first and second optical transmission channels connecting the transmitter and the receiver to each other, wherein the transmitter and the receiver share a first seed key made of random numbers in advance, the first seed key provides a shared basis to the transmitter and the receiver, in the transmitter,
  an output of the first random number generator is set as a random number signal and is error-correcting coded in the encoder, and an information portion and a redundancy portion of the coded random number signal are separated into a random number code and a check symbol, respectively,
  an output of the second random number generator is set as a dummy random number, an output of the third random number generator determines a random basis for transmission of the random number signal and the dummy random number, the random number signal is used as a signal when the random basis and the shared basis coincide with each other, and the dummy random number is used as the signal when the random basis and the shared basis do not coincide with each other,
  the first modulator forms first signal light by superimposing the signal with the random basis on output light from the first light source,
  in the formation of the first signal light, the output light from the first light source is accompanied with fluctuations, or fluctuations are superimposed thereon in the first light source or the first modulator,
  the first signal light is outputted to the first optical transmission channel,
  the equipment for privacy amplification generates a secret key by reducing the number of bits of the random number signal which is the output of the first random number generator, the encrypter encrypts a transmission signal by use of the secret key, and the encrypted transmission signal and the check symbol are multiplexed, and second signal light modulated with the multiplexed signal is outputted from the optical transmitter to the second optical transmission channel, in the receiver, the second optical detector receives the second signal light, and the encrypted transmission signal and the check symbol are separated therein, and in the receiver, the first optical detector receives the first signal light, a judgment is made on values of the random basis and the signal and the received random basis is checked with the shared basis, the signal is regarded as a random number code when the random basis and the shared basis coincide with each other, and the signal is regarded as a dummy random number when the random basis and the shared basis do not coincide with each other, the random number code is checked by use of the check symbol to find a basis judgment error, and when there is a judgment error, the basis is corrected and according to the correction the judgment of the random number code and the dummy random number is corrected, the decoder decodes the random number code by use of the check symbol after the correction for the basis-judgment error, the equipment for privacy amplification extracts the secret key by reducing the number of bits, and the decrypter decrypts the encoded transmission signal into the transmission signal by use of the extracted secret key.

13. The cryptographic communication system according to claim 12, wherein, the fluctuations of the output light from the first light source are phase fluctuations or intensity fluctuations, or phase fluctuations or intensity fluctuations are superimposed on the first signal light in the first light source or the first modulator.

14. The cryptographic communication system according to claim 12, wherein, the transmitter and the receiver share a second seed key in advance, in the transmitter, the random number signal generated from the first random number signal generator is encrypted with the second seed key, and thereafter is error-correcting coded in the encoder, and in the receiver, the signal is first error-corrected in the decoder and next is decrypted by use of the second seed key.

15. The cryptographic communication system according to claim 12, wherein each of the random number signal and the dummy random number is binary while the random basis is binary, and the signal is transmitted in a quaternary state in combination.

16. The cryptographic communication system according to claim 12, wherein each of the random number signal and the dummy random number is n-ary while the random basis is m-ary, and the signal is thus transmitted in a n×m-ary state in combination.

17. A cryptographic communication system comprising:

a transmitter including a first random number generator, an encoder for error-correcting coding, a second random number generator, a third random number generator, a first light source, a first modulator, equipment for privacy amplification, an encrypter, and an optical transmitter having a second light source and a second modulator;

a receiver including a first optical detector, a decoder for decoding an error-correcting code, equipment for privacy amplification, a second optical detector and a decrypter; and first and second optical transmission channels connecting the transmitter and the receiver to each other, wherein the transmitter and the receiver share a first seed key made of random numbers in advance, the first seed key provides a shared basis to the transmitter and the receiver, in the transmitter, an output of the first random number generator is set as a random number signal and is error-correcting coded in the encoder, an information portion and a redundancy portion of the random number signal are separated into a random number code and a check symbol, respectively, an output of the second random number generator is set as a dummy random number, an output of the third random number generator determines a random basis for transmission of the random number signal and the dummy random number, a signal of each random basis is determined by using the random number signal when the random basis and the shared basis coincide with each other, and by using the dummy random number when the random basis and the shared basis do not coincide with each other, when the random basis and the shared basis do not coincide with each other, the shared basis is again used for determining the next signal, the next signal is determined by using the random number signal when the next random basis coincides with the shared basis, and by using the dummy random number when the next random basis does not coincide with the shared basis, the same processing is repeated, and the next shared basis is referred after the shared basis coincides with the random basis, the first modulator forms first signal light by superimposing the signal with the random basis on output light from the first light source, in the formation of the first signal light, the output light from the first light source is accompanied with fluctuations, or fluctuations are superimposed thereon using the first light source or the first modulator, the first signal light is outputted to the first optical transmission channel, the equipment for privacy amplification generates a secret key by reducing the number of bits of the random number signal which is the output of the first random number generator, the encrypter encrypts a transmission signal by use of the secret key, and the encrypted transmission signal and the check symbol are multiplexed, and second signal light modulated with the multiplexed signal is outputted from the optical transmitter to the second optical transmission channel, in the receiver, the second optical detector receives the second signal light, and the encrypted transmission signal and the check symbol are separated therein, the first optical detector receives the first signal light, a judgment is made on values of the random basis and the signal and the received random basis is checked with the shared basis, and the process of checking the random basis with the shared basis is repeated using the same shared basis until the shared basis and the random basis coincide with each other, the signal is regarded as a random number code when the shared basis and the random basis coincide with each other, and the signal is regarded as a dummy random number when the shared basis and the random basis do not coincide with each other, the same process is repeated for the next shared basis, the random number code is checked by use of the check symbol to find a basis judgment error, and when there is a judgment error, the basis is corrected and according to the correction the judgment of the random number code and the dummy random number is corrected, and the decoder decodes the random number code by use of the check symbol after the correction of the basis-judgment error, the equipment for privacy amplification extracts the secret key by reducing the number of bits, and the decrypter decrypts the encoded transmission signal into the transmission signal by use of the extracted secret key.

18. The cryptographic communication system according to claim 17, wherein, the fluctuations of the output light from the first light source are phase fluctuations or intensity fluctuations, or phase fluctuations or intensity fluctuations are super-imposed on the first signal light in the first light source or the first modulator.

19. The cryptographic communication system according to claim 17, wherein, the transmitter and the receiver share a second seed key in advance, in the transmitter, the random number signal generated from the first random number signal generator is encrypted with the second seed key, and thereafter is error-correcting coded in the encoder, and in the receiver, the signal is first error-corrected in the decoder and next is decrypted by use of the second seed key.

20. The cryptographic communication system according to claim 17, wherein each of the random number signal and the dummy random number is binary while the random basis is binary, and the signal is transmitted in a quaternary state in combination.

* * * * *